(12) United States Patent
Wei et al.

(10) Patent No.: US 12,532,249 B2
(45) Date of Patent: Jan. 20, 2026

(54) ROAMING STEERING METHOD, APPARATUS, DEVICE, STORAGE MEDIUM, AND SYSTEM

(71) Applicant: HUAWEI TECHNOLOGIES CO., LTD., Guangdong (CN)

(72) Inventors: Qikun Wei, Nanjing (CN); Dewei Bao, Nanjing (CN); Fuqing Sun, Shenzhen (CN); Xiaofei Bai, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 605 days.

(21) Appl. No.: 17/947,562

(22) Filed: Sep. 19, 2022

(65) Prior Publication Data
US 2023/0014083 A1 Jan. 19, 2023

Related U.S. Application Data

(63) Continuation of application No. PCT/CN2020/142262, filed on Dec. 31, 2020.

(30) Foreign Application Priority Data

Mar. 27, 2020 (CN) .......................... 202010229128.0

(51) Int. Cl.
*H04W 4/00* (2018.01)
*H04W 36/08* (2009.01)
(Continued)

(52) U.S. Cl.
CPC .......... *H04W 48/16* (2013.01); *H04W 36/08* (2013.01); *H04W 48/20* (2013.01)

(58) Field of Classification Search
CPC ...... H04W 48/16; H04W 48/20; H04W 36/08
(Continued)

(56) References Cited

U.S. PATENT DOCUMENTS

2007/0265021 A1 11/2007 Igaue et al.
2012/0294176 A1 11/2012 Miyata
(Continued)

FOREIGN PATENT DOCUMENTS

CN 101138245 A 3/2008
CN 102075980 A 5/2011
(Continued)

OTHER PUBLICATIONS

Broadcom Corporation, Some Considerations for developing RAN rules for WLAN/3GPP Radio Interworking, 3GPP TSG-RAN WG2 Meeting #85-BIS, R2-141214, Mar. 31-Apr. 4, 2014 Valencia, Spain, 9 pages.
(Continued)

*Primary Examiner* — Temica M Beamer

(57) ABSTRACT

This application discloses a roaming steering method, an apparatus, a device, a storage medium, and a system. In this application, a reference roaming steering condition is determined by an access control device by performing, for a plurality of times, a roaming steering test on one or more terminals belonging to a reference model, and the reference model is a model of a target terminal. Therefore, the reference roaming steering condition is similar to a roaming rule in the target terminal. In this case, when a first access point device obtains the reference roaming steering condition and determines that the target terminal satisfies the reference roaming steering condition, even if the target terminal does not unconditionally obey roaming steering of the first access point device, there is a high probability that the target terminal is successfully steered to roam.

20 Claims, 5 Drawing Sheets

(51) Int. Cl.
*H04W 48/16* (2009.01)
*H04W 48/20* (2009.01)

(58) Field of Classification Search
USPC .................................................... 455/435.1
See application file for complete search history.

(56) References Cited

U.S. PATENT DOCUMENTS

| | | | |
|---|---|---|---|
| 2014/0204910 A1 | 7/2014 | Müller et al. | |
| 2014/0369394 A1* | 12/2014 | Ruuska ................ | H04W 16/28 |
| | | | 375/224 |
| 2015/0350873 A1 | 12/2015 | Choi et al. | |
| 2018/0206184 A1* | 7/2018 | Bahr ..................... | H04W 24/02 |
| 2019/0075469 A1* | 3/2019 | Mahoney ............. | H04B 17/318 |
| 2019/0104463 A1 | 4/2019 | Khoury | |
| 2019/0297553 A1 | 9/2019 | Wang et al. | |
| 2019/0313238 A1* | 10/2019 | Palanigounder ........ | H04W 8/20 |

FOREIGN PATENT DOCUMENTS

| | | |
|---|---|---|
| CN | 102833824 A | 12/2012 |
| CN | 103067975 A | 4/2013 |
| CN | 103686890 A | 3/2014 |
| CN | 103974360 A | 8/2014 |
| CN | 105027620 A | 11/2015 |
| CN | 106954225 A | 7/2017 |
| CN | 107580360 A | 1/2018 |
| CN | 107889145 A | 4/2018 |
| CN | 103945361 B | 5/2018 |
| CN | 108811005 A | 11/2018 |
| CN | 110708734 A | 1/2020 |
| CN | 110868740 A | 3/2020 |
| JP | 2006067178 A | 3/2006 |
| JP | 2014099737 A | 5/2014 |
| JP | 2018506233 A | 3/2018 |

OTHER PUBLICATIONS

IEEE Std 802.11v-2011 "Part 11: Wireless LAN Medium Access Control(MAC) and Physical Layer (PHY) specifications—Amendment 8: IEEE 802.11 WirelessNetwork Management", IEEE Computer Society,Feb. 9, 2011, total 433 pages.

IEEE Std 802.11—2012 IEEE Standard for Information technology Telecommunications and information exchange between systems Local and metropolitan area networks Specific requirements Part 11: Wireless LAN Medium Access Control (MAC) and Physical Layer (PHY) Specifications, IEEE Computer Society, Sponsored by the LAN/MAN Standards Committee, Mar. 29, 2012, 2793 pages.

* cited by examiner

ROAMING STEERING METHOD, APPARATUS, DEVICE, STORAGE MEDIUM, AND SYSTEM

CROSS-REFERENCE TO RELATED APPLICATIONS

This application is a continuation of International Application No. PCT/CN2020/142262, filed on Dec. 31, 2020, which claims priority to Chinese Patent Application No. 202010229128.0, filed on Mar. 27, 2020. The disclosures of the aforementioned applications are hereby incorporated by reference in their entireties.

TECHNICAL FIELD

This application relates to the field of communication technologies, and in particular, to a roaming steering method, an apparatus, a device, a storage medium, and a system.

BACKGROUND

A wireless local area network (WLAN) includes two architectures. One of the architectures includes an access control device (AC) and a plurality of access point devices (APs). The access control device is configured to manage and control the plurality of access point devices, and the access point device is configured to serve a terminal. One access point device corresponds to one basic service set (BSS), and the plurality of access point devices may correspond to one extended service set (ESS), that is, the ESS may include a plurality of BSSs. A process in which the terminal is handed over between different BSSs in the ESS may be referred to as roaming. To improve roaming experience, how to perform roaming steering becomes an urgent problem to be resolved currently.

In a related technology, a roaming steering method is provided, including: A first access point device detects a signal strength during communication between the first access point device and a target terminal. The target terminal is a terminal associated with the first access point device, and the first access point device is one of the foregoing plurality of access point devices. If the signal strength is less than or equal to a strength threshold, the first access point device sends a basic service transition management (BTM) packet to the target terminal. The BTM packet carries an identifier/identifiers of one or more reference access point devices. The BTM packet is used to steer the target terminal to roam to one of the one or more reference access point devices. The one or more reference access point devices are access point devices that are in neighboring access point devices of the first access point device and that have great signal strengths when communicating with the target terminal.

However, the target terminal does not unconditionally obey roaming steering of the first access point device, to be specific, the target terminal stores a set of roaming rules, to determine whether to accept the roaming steering of the first access point device. In addition, roaming rules followed by terminals of different models may be different. Therefore, when roaming steering is performed according to the foregoing method, a roaming steering success rate is low.

SUMMARY

This application provides a roaming steering method, an apparatus, a device, a storage medium, and a system, so that a roaming steering success rate can be improved. The technical solutions are as follows:

According to a first aspect, a roaming steering method is provided. In the method, a first access point device determines a signal strength during communication between each of one or more second access point devices and a target terminal, to obtain one or more signal strengths. The one or more second access point devices include the first access point device and/or a neighboring access point device of the first access point device. The target terminal is a terminal associated with the first access point device. If determining, based on the one or more signal strengths, that the target terminal satisfies a reference roaming steering condition, the first access point device sends a roaming steering instruction to the target terminal. The roaming steering instruction carries an identifier/identifiers of one or more reference access point devices. The roaming steering instruction is used to steer the target terminal to roam to one of the one or more reference access point devices. The reference roaming steering condition is determined by an access control device by performing, for a plurality of times, a roaming steering test on one or more terminals belonging to a reference model. The reference model is a model of the target terminal.

The reference roaming steering condition is determined by the access control device by performing, for a plurality of times, the roaming steering test on the one or more terminals belonging to the reference model, and the reference model is the model of the target terminal. Therefore, the reference roaming steering condition is similar to a roaming rule in the target terminal. In this case, when the first access point device obtains the reference roaming steering condition and determines that the target terminal satisfies the reference roaming steering condition, even if the target terminal does not unconditionally obey roaming steering of the first access point device, there is a high probability that the target terminal is successfully steered to roam.

Optionally, before determining, based on the one or more signal strengths, that the target terminal satisfies the reference roaming steering condition, the first access point device may determine a model identifier of the target terminal, and determine the reference roaming steering condition based on the model identifier of the target terminal.

The first access point device may obtain the reference roaming steering condition from the access control device based on the model identifier of the target terminal in an active manner or a passive manner. The two manners are described below.

In a first manner, the first access point device receives and stores a first correspondence sent by the access control device. The first correspondence is used to indicate a roaming steering condition corresponding to each model identifier identified by the access control device. In this way, when determining the reference roaming steering condition based on the model identifier, the first access point device may determine the reference roaming steering condition from the first correspondence based on the model identifier of the target terminal.

That is, in the first manner, after determining that the first correspondence is obtained, the access control device may actively send the first correspondence to the first access point device. Then, when the first access point device needs to determine the reference roaming steering condition, the first access point device may determine the reference roaming steering condition from the first correspondence based on the model identifier of the target terminal. In this way, in a roaming steering process, the first access point device does not need to interact with the access control device to obtain the reference roaming steering condition, but directly determines the reference roaming steering condition from the locally stored first correspondence based on the model identifier of the target terminal. This reduces a quantity of times that the first access point device interacts with the access control device, so that overheads are reduced.

In a second manner, the first access point device sends a first steering-condition obtaining request to the access control device. The first steering-condition obtaining request carries the model identifier of the target terminal. The first access point device receives the reference roaming steering condition sent by the access control device. The reference roaming steering condition is determined by the access control device based on the model identifier of the target terminal and from a first correspondence stored in the access control device. The first correspondence is used to indicate a roaming steering condition corresponding to each model identifier identified by the access control device.

That is, in the second manner, after determining the first correspondence, the access control device does not deliver the first correspondence to the first access point device. Instead, when the first access point device needs to determine the reference roaming steering condition, the first access point device sends, to the access control device, the first steering-condition obtaining request that carries the model identifier of the target terminal. Further, after the access control device determines the reference roaming steering condition from the first correspondence based on the model identifier of the target terminal, the access control device sends the reference roaming steering condition to the first access point device. In this way, after the reference roaming steering condition is updated, it can be ensured that the first access point device can obtain a reference roaming steering condition with high accuracy in time.

Optionally, an implementation process in which the first access point device determines the model identifier of the target terminal may include: The first access point device obtains the model identifier of the target terminal from the access control device.

Optionally, there may be two manners in which the first access point device obtains the model identifier of the target terminal from the access control device, which are a manner (1) and a manner (2) below.

(1) The first access point device sends a model query request to the access control device. The model query request carries a media access control (MAC) address of the target terminal. The first access point device receives the model identifier that is sent by the access control device and that is of the target terminal.

That is, in the manner (1), the access control device stores a second correspondence in advance. The second correspondence is used to indicate a model identifier corresponding to each MAC address identified by the access control device. When receiving the model query request sent by the first access point device, the access control device may determine the model identifier of the target terminal from the second correspondence based on the MAC address that is carried in the model query request and that is of the target terminal, and further send the model identifier of the target terminal to the first access point device. In this way, the access control device does not need to deliver the second correspondence to the first access point device in advance. In addition, when the access control device updates the model identifier of the target terminal, it can be further ensured that the first access point device can obtain a model identifier with high accuracy in time.

(2) The first access point device receives the model identifier that is sent by the access control device and that is of the target terminal. The model identifier of the target terminal is determined by the access control device by using a MAC address of the target terminal after the access control device obtains, from a data packet sent by the target terminal, the MAC address of the target terminal.

That is, in the manner (2), after receiving the data packet sent by the target terminal, the access control device may directly obtain the MAC address of the target terminal from the data packet, determine the model identifier of the target terminal from a second correspondence based on the MAC address of the target terminal, and directly send the model identifier to the first access point device. In other words, the access control device may actively determine the model identifier of the target terminal and deliver the model identifier to the first access point device. In this way, the first access point device does not need to request the model identifier of the target terminal from the access control device when performing roaming steering on the target terminal. Therefore, interaction between the first access point device and the access control device in a process in which the first access point device performs roaming steering on the target terminal can be reduced, so that roaming steering efficiency can be improved.

For the second correspondence mentioned in the foregoing manner (1) and the manner (2), because a data packet sent by a terminal associated with an access point device managed by the access control device to another device passes through the access control device, the access control device may determine a MAC address of the terminal based on the data packet sent by the terminal, to further determine a model identifier of the terminal, so as to create the second correspondence based on the MAC address and the model identifier of the terminal. Using the target terminal as an example, the access control device may obtain, from the data packet sent by the target terminal, the MAC address of the target terminal and model description information of the target terminal. The access control device determines the model identifier of the target terminal based on the model description information of the target terminal, and stores the MAC address and the model identifier of the target terminal in the second correspondence.

Because terminals of different models have different model description information, the access control device may distinguish between the terminals of different models based on a difference between the model description information. That is, using the target terminal as an example, the access control device may directly use the model description information of the target terminal as the model identifier of the target terminal. Certainly, the access control device may alternatively distinguish between models of the target terminal based on the model description information of the target terminal, and further allocate the corresponding model identifier to the target terminal.

In this application, the first access point device may not only determine the reference roaming steering condition in the first manner or the second manner by using the model identifier of the target terminal, but also alternatively determine the reference roaming steering condition in another manner. For example, the first access point device may determine the reference roaming steering condition based on a MAC address of the target terminal. To be specific, the first access point device sends a second steering-condition obtaining request to the access control device. The second steering-condition obtaining request carries the MAC address of the target terminal. The first access point device receives the reference roaming steering condition sent by the access control device. The reference roaming steering condition is determined by the access control device, from a first correspondence stored in the access control device, after the access control device determines a model identifier of the target terminal based on the MAC address of the target terminal. The first correspondence is used to indicate a roaming steering condition corresponding to each model identifier identified by the access control device.

That is, in this manner, the first access point device does not need to determine the model identifier of the target terminal, and may directly send, to the access control device, the second steering-condition obtaining request carrying the MAC address of the target terminal. After receiving the second steering-condition obtaining request, the access control device determines the model identifier of the target terminal from a second correspondence based on the MAC address of the target terminal, and then determines the reference roaming steering condition from the first correspondence based on the model identifier of the target terminal. In other words, in the third manner, the first access point device may obtain the reference roaming steering condition by interacting with the access control device once, and does not need to first interact with the access control device once to determine a reference model identifier, and then interact with the access control device for the second time by using the model identifier to obtain the reference roaming steering condition. That is, a quantity of times that the first access point device interacts with the access control device is reduced, so that overheads are reduced.

Optionally, before sending the roaming steering instruction to the target terminal, the first access point device may further determine an identifier/identifiers of one or more reference access point devices. In an example, the first access point device obtains a roaming device list from the access control device. The roaming device list includes an identifier/identifiers of one or more third access point devices. The one or more third access point devices are neighboring access point devices of the first access point device. The first access point device determines, based on the roaming device list and from the one or more third access point devices, a third access point device as the one or more reference access point devices.

The first access point device may obtain the roaming device list from the access control device in an active manner or a passive manner. To be specific, the first access point device may directly receive the roaming device list sent by the access control device. Alternatively, the first access point device may send a list obtaining request to the access control device. The list obtaining request carries an identifier of the first access point device. The first access point device receives the roaming device list sent by the access control device.

For a manner in which the first access point device passively obtains the roaming device list, because the access control device may actively send the roaming device list corresponding to the first access point device to the first access point device, when the first access point device subsequently performs roaming steering on the target terminal, the first access point device may directly determine, from the roaming device list, the identifier/identifiers of the one or more reference access point devices, and does not need to interact with the access control device, so that overheads are reduced.

For a manner in which the first access point device actively obtains the roaming device list, the access control device may determine corresponding roaming device lists for different access point devices, and then store a device identifier of each access point device and a corresponding roaming device list in a correspondence between the device identifier and the roaming device list. In this way, when determining, based on the identifier of the first access point device, the roaming device list corresponding to the first access point device, the first access point device may determine, based on the identifier of the first access point device and from the stored correspondence between the device identifier and the roaming device list, the roaming device list corresponding to the first access point device, and send the roaming device list corresponding to the first access point device to the first access point device.

Certainly, after determining an identifier/identifiers of one or more corresponding third access point devices for different access point devices, the access control device may alternatively store, in a correspondence between a first device identifier and a second device identifier, a device identifier of each access point device and an identifier/identifiers of one or more corresponding third access point devices. To be specific, the identifier of each access point device is used as the first device identifier, the identifiers of the third access point devices corresponding to each access point device are used as the second device identifier, and the device identifier of each access point device and the identifier/identifiers of the corresponding one or more third access point devices are stored in the correspondence between the first device identifier and the second device identifier. In this way, when determining, based on the identifier of the first access point device, the roaming device list corresponding to the first access point device, the first access point device may use the identifier of the first access point device as the first device identifier, determine an identifier/identifiers of one or more corresponding second device identifiers from the correspondence between the first device identifier and the second device identifier, and further use the identifier/identifiers of the determined one or more second device identifiers as the identifier/identifiers of the one or more third access point devices corresponding to the first access point device. Then, the access control device generates the roaming device list including the identifier/identifiers of the one or more third access point devices, and sends the roaming device list to the first access point device.

After determining the identifier/identifiers of the one or more third access point devices corresponding to the first access point device, the access control device does not generate the roaming device list and deliver the roaming device list to the first access point device, but stores the correspondence between the device identifier and the roaming device list or the correspondence between the first device identifier and the second device identifier. Therefore, when the first access point device performs roaming steering on a terminal (for example, the target terminal), and the access control device receives the list obtaining request sent by the first access point device, the access control device may determine, in the foregoing manner, the roaming device list corresponding to the first access point device, and send the roaming device list corresponding to the first access point device to the first access point device. In this way, when the roaming device list corresponding to the first access point device is updated, it can be ensured that the first access point device can obtain a roaming device list with high accuracy.

Optionally, the one or more second access point devices include the one or more third access point devices. In this way, when the first access point device determines, based on the roaming device list corresponding to the first access point device and from the one or more third access point devices, the third access point device as the one or more reference access point devices, the first access point device may select, based on the roaming device list and from the one or more third access point devices, a third access point device that satisfies the reference roaming steering condition, to obtain the one or more reference access point devices.

According to a second aspect, a roaming steering method is provided. In the method, an access control device determines a reference roaming steering condition by performing, for a plurality of times, a roaming steering test on one or more terminals belonging to a reference model. The access control device sends the reference roaming steering condition to a first access point device. A model of a target terminal associated with the first access point device is the reference mode. The first access point device is an access point device controlled by the access control device.

That is, the access control device determines different roaming steering conditions for terminals of different models. In this way, during subsequent roaming steering, even if roaming rules in the terminals of different models are different, after the target terminal satisfies the reference roaming steering condition determined according to the foregoing method, when roaming steering is performed on the target terminal, a roaming steering success rate can be improved.

Optionally, the access control device may send the reference roaming steering condition to the first access point device in a plurality of manners. A part of the manners are described below.

In a first manner, the access control device sends a first correspondence to the first access point device. The first correspondence is used to indicate a roaming steering condition corresponding to each model identifier identified by the access control device.

In a second manner, the access control device receives a first steering-condition obtaining request sent by the first access point device. The first steering-condition obtaining request carries a model identifier of the target terminal. The access control device determines the reference roaming steering condition from a stored first correspondence based on the model identifier of the target terminal. The first correspondence is used to indicate a roaming steering condition corresponding to each model identifier identified by the access control device. The access control device sends the reference roaming steering condition to the first access point device.

For the foregoing two manners, the first access point device needs to first determine the model identifier of the target terminal, to determine the reference roaming steering condition. In an example, the access control device may obtain a MAC address of the target terminal, and determine the model identifier of the target terminal from a stored second correspondence based on the MAC address of the target terminal. The second correspondence is used to indicate a model identifier corresponding to each MAC address identified by the access control device. Then, the access control device sends the model identifier of the target terminal to the first access point device, to enable the first access point device to determine the reference roaming steering condition based on the model identifier of the target terminal.

Optionally, a manner in which the access control device obtains the MAC address of the target terminal may include: The access control device receives a model query request sent by the first access point device, where the model query request carries the MAC address of the target terminal; or the access control device obtains, from a data packet sent by the target terminal, the MAC address of the target terminal.

In a third manner, the access control device receives a second steering-condition obtaining request sent by the first access point device. The second steering-condition obtaining request carries a MAC address of the target terminal. The access control device determines a model identifier of the target terminal from a stored second correspondence based on the MAC address of the target terminal. The second correspondence is used to indicate a model identifier corresponding to each MAC address identified by the access control device. The access control device determines the reference roaming steering condition from a stored first correspondence based on the model identifier of the target terminal. The first correspondence is used to indicate a roaming steering condition corresponding to each model identifier identified by the access control device. The access control device sends the reference roaming steering condition to the first access point device.

In the foregoing third manner, before determining the model identifier of the target terminal from the stored second correspondence based on the MAC address of the target terminal, the access control device may further create the second correspondence. To be specific, the access control device obtains, from a data packet sent by the target terminal, the MAC address of the target terminal and model description information of the target terminal. The access control device determines the model identifier of the target terminal based on the model description information of the target terminal. The access control device stores the MAC address and the model identifier of the target terminal in the second correspondence.

Optionally, in this application, the access control device may further deliver a roaming device list corresponding to the first access point device to the first access point device. To be specific, the access control device receives a list obtaining request sent by the first access point device. The list obtaining request carries an identifier of the first access point device. The access control device determines, based on the identifier of the first access point device, the roaming device list corresponding to the first access point device. The roaming device list includes an identifier/identifiers of one or more third access point devices. The one or more third access point devices are neighboring access point devices of the first access point device. The access control device sends the roaming device list to the first access point device.

Optionally, before determining, based on the identifier of the first access point device, the roaming device list corresponding to the first access point device, the access control device may further determine the identifier/identifiers of the one or more third access point devices corresponding to the first access point device. To be specific, the access control device obtains a plurality of historical roaming records and roaming experience indication information that corresponds to each historical roaming record. Each historical roaming record includes an identifier of a source access point device and an identifier of a destination access point device. All source access point devices in the plurality of historical roaming records are the first access point device. The roaming experience indication information is used to indicate whether signal quality is improved after a terminal associated with the first access point device roams to a destination access point device corresponding to a corresponding historical roaming record. The access control device determines the identifier/identifiers of the one or more third access point devices based on the plurality of historical roaming records and the roaming experience indication information that corresponds to each historical roaming record. The access control device stores the identifier/identifiers of the one or more third access point devices based on the identifier of the first access point device.

Based on the foregoing descriptions, the access control device may store a correspondence between a device identifier and a roaming device list, and may further store a correspondence between a first device identifier and a second device identifier. Therefore, an implementation process in which the access control device stores the identifier/identifiers of the one or more third access point devices based on the identifier of the first access point device may be: The access control device generates a roaming device list, namely, the roaming device list corresponding to the first access point device, by using the identifier/identifiers of the one or more third access point devices corresponding to the first access point device, and then stores, in the correspondence between the device identifier and the roaming device list, the identifier of the first access point device and the roaming device list corresponding to the first access point device. Alternatively, the access control device may use the identifier of the first access point device as the first device identifier, use the identifiers of the third access point devices corresponding to the first access point device as the second device identifier, and store, in the correspondence between the first device identifier and the second device identifier, the identifier of the first access point device and the identifier/identifiers of the one or more third access point devices corresponding to the first access point device.

Optionally, the access control device may determine, in a reinforcement learning manner based on the plurality of historical roaming records and the roaming experience indication information that corresponds to each historical roaming record, the identifier/identifiers of the one or more third access point devices corresponding to the first access point device. To be specific, the access control device selects, based on the roaming experience indication information that corresponds to each historical roaming record and from the plurality of historical roaming records, a historical roaming record that signal quality is improved after roaming. The access control device obtains an identifier of a neighboring access point device of the first access point device. The neighboring access point device is not included in the plurality of historical roaming records. The access control device determines an identifier of a destination access point device included in the selected historical roaming record and the obtained identifier of the neighboring access point device as the identifiers of the one or more third access point devices corresponding to the first access point device.

It should be noted that the reinforcement learning is one of AI algorithms, and is a target-oriented algorithm. This learning algorithm may make the determined one or more third access point devices more accurate. To be specific, the one or more third access point devices determined in the reinforcement learning manner are access point devices whose signal quality is improved after the third access point devices roam from the first access point device. In addition, the plurality of historical roaming records include an access point device on which roaming steering has been performed before, but an access point device on which roaming steering has not been performed may also be an access point device whose signal quality is improved. As a result, the neighboring access point device that is not included in the plurality of historical roaming records may also be used as the third access point device.

Optionally, that an access control device determines a reference roaming steering condition by performing, for a plurality of times, a roaming steering test on one or more terminals belonging to a reference model includes: The access control device determines a plurality of combinations of access point devices and a plurality of parameter combinations corresponding to each combination of access point devices. Each combination of access point devices includes an identifier of a source access point device and an identifier of a destination access point device. All source access point devices in the plurality of combinations of access point devices are the first access point device. The access control device performs, for a plurality of times based on the plurality of combinations of access point devices and the plurality of parameter combinations corresponding to each combination of access point devices, the roaming steering test on the one or more terminals belonging to the reference model by using different steering test conditions, to determine the reference roaming steering condition by using a standard that the one or more terminals belonging to the reference model are successfully steered to roam.

That is, after determining the plurality of combinations of access point devices, the access control device may not only perform the roaming steering test based on different signal strengths, but also perform the roaming steering test with reference to parameters such as a channel, a frequency band, and load of an access point device. To be specific, the access point device may perform the roaming steering test for a plurality of times based on one or more of features such as a signal strength, a channel, a frequency band, and load of an access point device, to further determine the reference roaming steering condition.

Optionally, the plurality of parameter combinations are obtained by combining different values of one or more dimension features. The one or more dimension features include one or more of a signal strength, a channel, a frequency band, and load.

According to a third aspect, a roaming steering apparatus is provided. The roaming steering apparatus has a function of implementing behavior of the roaming steering method in the first aspect. The roaming steering apparatus includes one or more modules, and the one or more modules are configured to implement the roaming steering method provided in the first aspect.

To be specific, the roaming steering apparatus includes a first determining module and a first sending module.

The first determining module is configured to determine a signal strength during communication between each of one or more second access point devices and a target terminal, to obtain one or more signal strengths. The one or more second access point devices include a first access point device and/or a neighboring access point device of the first access point device. The target terminal is a terminal associated with the first access point device.

The first determining module is further configured to determine, based on the one or more signal strengths, that the target terminal satisfies a reference roaming steering condition.

The first sending module is configured to: when the first determining module determines that the target terminal satisfies the reference roaming steering condition, send a roaming steering instruction to the target terminal. The roaming steering instruction carries an identifier/identifiers of one or more reference access point devices. The roaming steering instruction is used to steer the target terminal to roam to one of the one or more reference access point devices. The reference roaming steering condition is determined by an access control device by performing, for a plurality of times, a roaming steering test on one or more terminals belonging to a reference model. The reference model is a model of the target terminal.

Optionally, the apparatus further includes:

a second determining module, configured to determine a model identifier of the target terminal; and a third determining module, configured to determine the reference roaming steering condition based on the model identifier.

Optionally, the apparatus further includes:

a first receiving module, configured to receive and store a first correspondence sent by the access control device. The first correspondence is used to indicate a roaming steering condition corresponding to each model identifier identified by the access control device.

The third determining module is configured to:

determine the reference roaming steering condition from the first correspondence based on the model identifier of the target terminal.

Optionally, the third determining module includes:

a first sending submodule, configured to send a first steering-condition obtaining request to the access control device, where the first steering-condition obtaining request carries the model identifier of the target terminal; and a first receiving submodule, configured to receive the reference roaming steering condition sent by the access control device, where the reference roaming steering condition is determined by the access control device based on the model identifier of the target terminal and from a first correspondence stored in the access control device, and the first correspondence is used to indicate a roaming steering condition corresponding to each model identifier identified by the access control device.

Optionally, the second determining module includes:

an obtaining submodule, configured to obtain the model identifier of the target terminal from the access control device.

Optionally, the obtaining submodule includes:

a sending unit, configured to send a model query request to the access control device, where the model query request carries a media access control MAC address of the target terminal, and the first access point device receives the model identifier that is sent by the access control device and that is of the target terminal; or a receiving unit, configured to receive the model identifier that is sent by the access control device and that is of the target terminal, where the model identifier of the target terminal is determined by the access control device by using a MAC address of the target terminal after the access control device obtains, from a data packet sent by the target terminal, the MAC address of the target terminal.

Optionally, the apparatus further includes:

a second sending module, configured to send a second steering-condition obtaining request to the access control device, where the second steering-condition obtaining request carries a MAC address of the target terminal; and a second receiving module, configured to receive the reference roaming steering condition sent by the access control device, where the reference roaming steering condition is determined by the access control device, from a first correspondence stored in the access control device, after the access control device determines a model identifier of the target terminal based on the MAC address of the target terminal, and the first correspondence is used to indicate a roaming steering condition corresponding to each model identifier identified by the access control device.

Optionally, the apparatus further includes:

an obtaining module, configured to obtain a roaming device list from the access control device, where the roaming device list includes an identifier/identifiers of one or more third access point devices, and the one or more third access point devices are neighboring access point devices of the first access point device; and a fourth determining module, configured to determine, based on the roaming device list and from the one or more third access point devices, a third access point device as the one or more reference access point devices.

Optionally, the obtaining module includes:

a second receiving submodule, configured to receive the roaming device list sent by the access control device; or a second sending submodule, configured to send a list obtaining request to the access control device, where the list obtaining request carries an identifier of the first access point device; and a third receiving submodule, configured to receive the roaming device list sent by the access control device.

Optionally, the one or more second access point devices include the one or more third access point devices.

The fourth determining module includes:

a selection submodule, configured to select, based on the roaming device list and from the one or more third access point devices, a third access point device that satisfies the reference roaming steering condition, to obtain the one or more reference access point devices.

According to a fourth aspect, a roaming steering apparatus is provided. The roaming steering apparatus has a function of implementing behavior of the roaming steering method in the second aspect. The roaming steering apparatus includes one or more modules, and the one or more modules are configured to implement the roaming steering method provided in the second aspect.

To be specific, the roaming steering apparatus includes a first determining module and a first sending module.

The first determining module is configured to determine a reference roaming steering condition by performing, for a plurality of times, a roaming steering test on one or more terminals belonging to a reference model.

The first sending module is configured to send the reference roaming steering condition to a first access point device. A model of a target terminal associated with the first access point device is the reference model. The first access point device is an access point device controlled by an access control device.

Optionally, the first sending module is configured to:

send a first correspondence to the first access point device, where the first correspondence is used to indicate a roaming steering condition corresponding to each model identifier identified by the access control device.

Optionally, the apparatus further includes:

a first receiving module, configured to receive a first steering-condition obtaining request sent by the first access point device, where the first steering-condition obtaining request carries a model identifier of the target terminal; and a second determining module, configured to determine the reference roaming steering condition from a stored first correspondence based on the model identifier of the target terminal, where the first correspondence is used to indicate a roaming steering condition corresponding to each model identifier identified by the access control device.

Optionally, the apparatus further includes:

a first obtaining module, configured to obtain a media access control MAC address of the target terminal;

a third determining module, configured to determine the model identifier of the target terminal from a stored second correspondence based on the MAC address of the target terminal, where the second correspondence is used to indicate a model identifier corresponding to each MAC address identified by the access control device; and a second sending module, configured to send the model identifier of the target terminal to the first access point device, to enable the first access point device to determine the reference roaming steering condition based on the model identifier of the target terminal.

Optionally, the first obtaining module includes:

a receiving submodule, configured to receive a model query request sent by the first access point device, where the model query request carries the MAC address of the target terminal; or an obtaining submodule, configured to obtain, from a data packet sent by the target terminal, the MAC address of the target terminal.

Optionally, the apparatus further includes:

a second receiving module, configured to receive a second steering-condition obtaining request sent by the first access point device, where the second steering-condition obtaining request carries a MAC address of the target terminal; and a fourth determining module, configured to determine a model identifier of the target terminal from a stored second correspondence based on the MAC address of the target terminal, where the second correspondence is used to indicate a model identifier corresponding to each MAC address identified by the access control device; and determine the reference roaming steering condition from a stored first correspondence based on the model identifier of the target terminal, where the first correspondence is used to indicate a roaming steering condition corresponding to each model identifier identified by the access control device.

Optionally, the apparatus further includes:

a second obtaining module, configured to obtain, from a data packet sent by the target terminal, the MAC address of the target terminal and model description information of the target terminal;

a fifth determining module, configured to determine the model identifier of the target terminal based on the model description information of the target terminal; and a first storage module, configured to store the MAC address and the model identifier of the target terminal in the second correspondence.

Optionally, the apparatus further includes:

a third receiving module, configured to receive a list obtaining request sent by the first access point device, where the list obtaining request carries an identifier of the first access point device;

a sixth determining module, configured to determine, based on the identifier of the first access point device, a roaming device list corresponding to the first access point device, where the roaming device list includes an identifier/identifiers of one or more third access point devices, and the one or more third access point devices are neighboring access point devices of the first access point device; and a third sending module, configured to send the roaming device list to the first access point device.

Optionally, the apparatus further includes:

a third obtaining module, configured to obtain a plurality of historical roaming records and roaming experience indication information that corresponds to each historical roaming record, where each historical roaming record includes an identifier of a source access point device and an identifier of a destination access point device, all source access point devices in the plurality of historical roaming records are the first access point device, and the roaming experience indication information is used to indicate whether signal quality is improved after a terminal associated with the first access point device roams to a destination access point device corresponding to a corresponding historical roaming record;

a seventh determining module, configured to determine the identifier/identifiers of the one or more third access point devices based on the plurality of historical roaming records and the roaming experience indication information that corresponds to each historical roaming record; and a second storage module, configured to store the identifier/identifiers of the one or more third access point devices based on the identifier of the first access point device.

Optionally, the seventh determining module includes:

a determining submodule, configured to determine the identifier/identifiers of the one or more third access point devices in a reinforcement learning manner based on the plurality of historical roaming records and the roaming experience indication information that corresponds to each historical roaming record.

Optionally, the determining submodule is configured to:

select, based on the roaming experience indication information that corresponds to each historical roaming record and from the plurality of historical roaming records, a historical roaming record that signal quality is improved after roaming;

obtain an identifier of a neighboring access point device of the first access point device, where the neighboring access point device is not included in the plurality of historical roaming records; and determine an identifier of a destination access point device included in the selected historical roaming record and the obtained identifier of the neighboring access point device as the identifiers of the one or more third access point devices.

Optionally, the first determining module is configured to:

determine a plurality of combinations of access point devices and a plurality of parameter combinations corresponding to each combination of access point devices, where each combination of access point devices includes an identifier of a source access point device and an identifier of a destination access point device, and all source access point devices in the plurality of combinations of access point devices are the first access point device; and perform, for a plurality of times based on the plurality of combinations of access point devices and the plurality of parameter combinations corresponding to each combination of access point devices, the roaming steering test on the one or more terminals belonging to the reference model by using different steering test conditions, to determine the reference roaming steering condition by using a standard that the one or more terminals belonging to the reference model are successfully steered to roam.

Optionally, the plurality of parameter combinations are obtained by combining different values of one or more dimension features. The one or more dimension features include one or more of a signal strength, a channel, a frequency band, and load.

According to a fifth aspect, an access point device is provided. The access point device includes a processor and a memory. The memory is configured to store a program for performing the roaming steering method provided in the first aspect, and store data used to implement the roaming steering method provided in the first aspect. The processor is configured to execute the program stored in the memory. The access control device may further include a communication bus. The communication bus is configured to establish a connection between the processor and the memory.

According to a sixth aspect, an access control device is provided. The access control device includes a processor and a memory. The memory is configured to store a program for performing the roaming steering method provided in the second aspect, and store data used to implement the roaming steering method provided in the second aspect. The processor is configured to execute the program stored in the memory. The access control device may further include a communication bus. The communication bus is configured to establish a connection between the processor and the memory.

According to a seventh aspect, a computer-readable storage medium is provided. The computer-readable storage medium stores instructions. When the instructions are run on a computer, the computer is enabled to perform the roaming steering method in the first aspect.

According to an eighth aspect, a computer-readable storage medium is provided. The computer-readable storage medium stores instructions. When the instructions are run on a computer, the computer is enabled to perform the roaming steering method in the second aspect.

According to a ninth aspect, a computer program product including instructions is provided. When the computer program product runs on a computer, the computer is enabled to perform the roaming steering method in the first aspect.

According to a tenth aspect, a computer program product including instructions is provided. When the computer program product runs on a computer, the computer is enabled to perform the roaming steering method in the second aspect.

According to an eleventh aspect, a roaming steering system is provided. The roaming steering system includes a plurality of access point devices, an access control device, and a target terminal. The plurality of access point devices include a first access point device. The first access point device is configured to implement steps of the method in the first aspect, and the access control device is configured to implement steps of the method in the second aspect.

Technical effects obtained in the second aspect to the eleventh aspect are similar to technical effects obtained by using a corresponding technical means in the first aspect. Details are not described herein again.

The technical solutions provided in this application can bring at least the following beneficial effects:

In this application, a reference roaming steering condition is determined by an access control device by performing, for a plurality of times, a roaming steering test on one or more terminals belonging to a reference model, and the reference model is a model of a target terminal. Therefore, the reference roaming steering condition is similar to a roaming rule in the target terminal. In this case, when the first access point device obtains the reference roaming steering condition and determines that the target terminal satisfies the reference roaming steering condition, even if the target terminal does not unconditionally obey roaming steering of the first access point device, there is a high probability that the target terminal is successfully steered to roam. In addition, the access control device determines different roaming steering conditions for terminals of different models. Even if roaming rules in the terminals of different models are different, when roaming steering is performed according to the foregoing method, a roaming steering success rate may also be improved.

DESCRIPTION OF EMBODIMENTS

To make objectives, technical solutions, and advantages of this application clearer, the following further describes implementations of this application in detail with reference to the accompanying drawings.

For ease of understanding, before a roaming steering method provided in embodiments of this application is explained in detail, terms and implementation environments in embodiments of this application are first explained or introduced.

Terms in embodiments of this application are first explained.

BSS: A service provided by a single access point device is referred to as a BSS.

ESS: A unified service that is managed by a plurality of access point devices by using a same access control device and that is provided by using a same service set identifier (SSID) is referred to as an ESS. That is, one ESS may include a plurality of BSSs.

Association: A state in which a communication connection is established between a terminal and an access point device. A terminal is associated with an access point device. To be specific, the terminal accesses the access point device, and can further communicate with the access point device, or the access point device can serve the terminal.

Roaming: A process in which a terminal is handed over between different BSSs in a same ESS is referred to as roaming. One access point device corresponds to one BSS, and one ESS may include a plurality of BSSs. In other words, a process in which a terminal is handed over from an association with one access point device to an association with another access point device is referred to as roaming.

Figure 1:
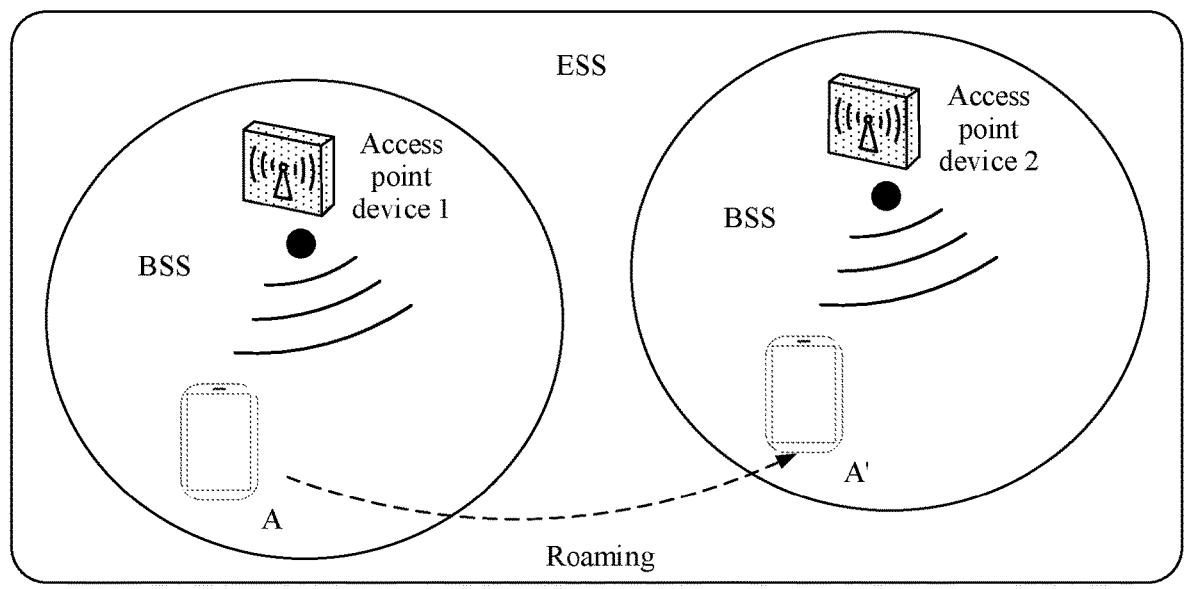
FIG. 1 is a schematic diagram of a roaming process according to an embodiment of this application.

Refer to FIG. 1. For example, an ESS includes two BSSs. One BSS corresponds to an access point device 1, and the other BSS corresponds to an access point device 2. A terminal is first associated with the access point device 1 at a location point A. When the terminal moves to a location point A', the terminal is associated with the access point device 2. In other words, the terminal roaming is associated with the access point device 1 before roaming, and is associated with the access point device 2 after the roaming.

Terminal: A movable terminal device is also referred to a mobile terminal. In a WLAN, the terminal is also referred to as a station (STA). For example, in embodiments of this application, the terminal may be a laptop computer (which is also referred to as a personal computer (PC)), a game console, a tablet computer, a smartphone, an e-reader, a digital broadcast terminal, a message transceiver device, a personal digital assistant, or a wearable device. The wearable device may be a band, a watch, or the like.

Signal strength: A strength of a signal received by a terminal and sent by an access point device, where a unit of the strength is dbm. Generally, the signal strength is a negative value. A larger value indicates better signal quality. In most scenarios, when the signal strength is −50 or a larger value, the signal quality is very good, and when the signal strength is −70 or a smaller value, it is considered that the signal quality is poor.

An implementation environment in embodiments of this application is described below.

Figure 2:
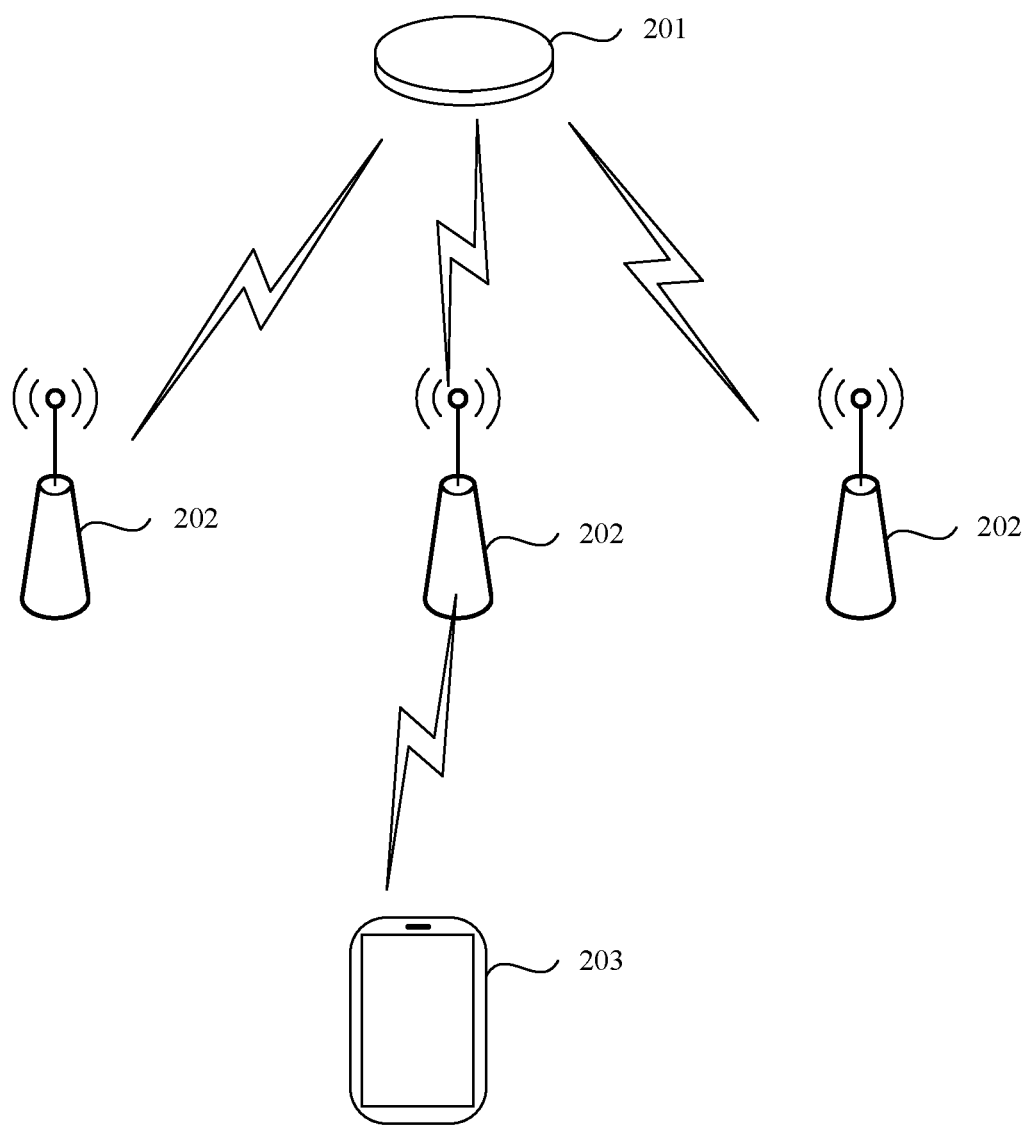
FIG. 2 is a schematic diagram of an implementation environment according to an embodiment of this application.

FIG. 2 is a schematic diagram of an implementation environment related to a roaming steering method according to an embodiment of this application. A network architecture related to the implementation environment includes an access control device 201, a plurality of access point devices 202 (where in FIG. 2, three access point devices are used as an example to represent the plurality of access point devices), and a target terminal 203.

The access control device 201 is separately connected to the plurality of access point devices 202 by using a wireless or wired network, to perform communication. The target terminal 203 may be connected to one of the plurality of access point devices 202 by using a wireless or wired network, to perform communication. That is, the target terminal 203 may be associated with one of the plurality of access point devices 202.

The access control device 201 may manage the plurality of access point devices 202. For example, the access control device 201 may uniformly deliver one or more configurations to the plurality of access point devices 202, and perform software upgrade, and may further control a quantity of access point devices in a working state based on a time period. The access point device associated with the target terminal 203 may serve the target terminal 203. For example, the target terminal 203 may sequentially send a data packet to another device by using the access point device associated with the target terminal 203 and the access control device 201, or may sequentially receive, by using the access control device 201 and the access point device associated with the target terminal 203, a data packet sent by another device.

In this embodiment of this application, in addition to the foregoing functions, the access control device 201 may further have a function such as determining a model identifier of the target terminal 203 by using a MAC address of the target terminal 203, determining a reference roaming steering condition by performing, for a plurality of times, a steering test on one or more terminals belonging to a reference model, or determining a roaming device list corresponding to the access point device. The reference model is a model of the target terminal 203, the one or more terminals belonging to the reference model may include the target terminal 203, and the reference roaming steering condition may also be referred to as a terminal profile of the one or more terminals belonging to the reference model.

In addition to the foregoing functions, the access point device 202 may further have a function such as performing roaming steering on the target terminal 203, or exchanging a signal strength with the target terminal 203.

Figure 3:
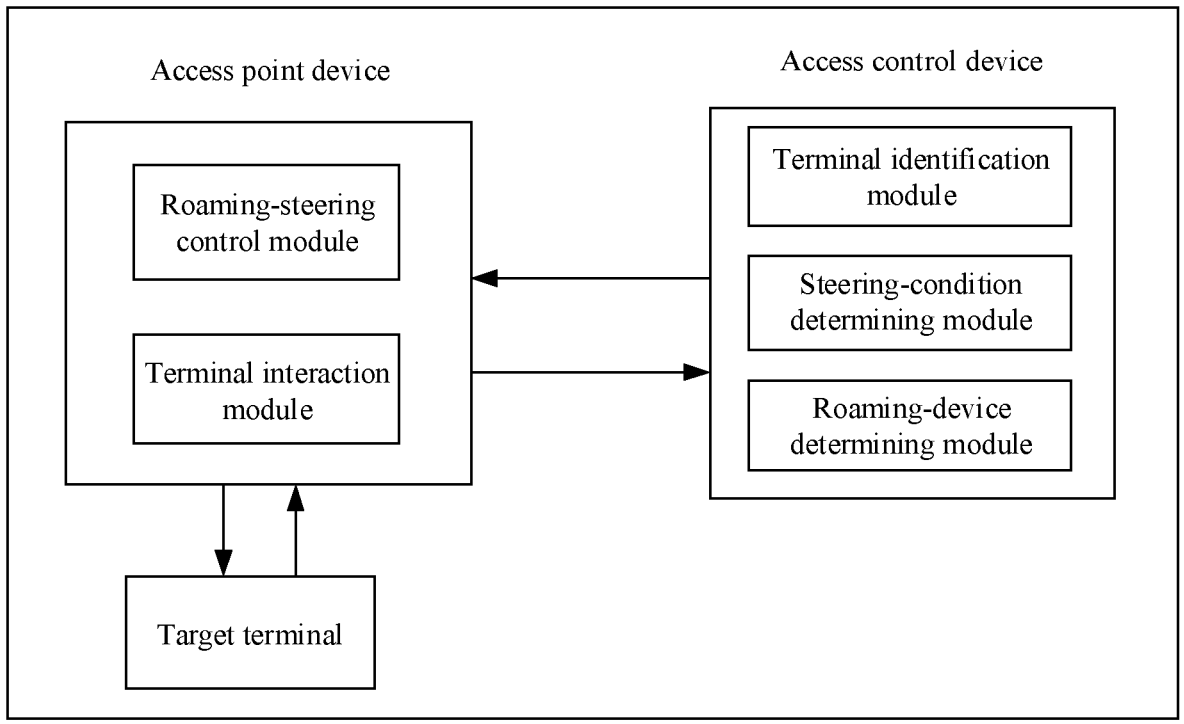
FIG. 3 is a schematic diagram of another implementation environment according to an embodiment of this application.

To be specific, refer to FIG. 3. The access control device 201 may include a terminal identification module, a steering-condition determining module, and a roaming-device determining module. The access point device 202 may include a roaming-steering control module and a terminal interaction module.

The terminal identification module is configured to identify the MAC address of the target terminal 203 from the data packet sent by the target terminal 203, and further determine the model identifier of the target terminal 203 by using the MAC address of the target terminal 203. The steering-condition determining module is configured to determine the reference roaming steering condition by performing, for a plurality of times, the steering test on the one or more terminals belonging to the reference model. The roaming-device determining module is configured to determine the roaming device list corresponding to the access point device 202. Optionally, the roaming-device determining module is configured to periodically determine, in a reinforcement learning manner, the roaming device list corresponding to the access point device 202.

The roaming-steering control module is configured to determine, based on the reference roaming steering condition, when to send a roaming steering instruction to the target terminal 203, and is further configured to determine, based on the roaming device list determined by the access control device 201, an access point device that is recommended to the target terminal 203 and that can be associated with the target terminal 203 after roaming. The terminal interaction module is configured to measure a signal strength received by the target terminal 203.

It should be noted that a network related to the implementation environment may be a WLAN. The network architecture related to the implementation environment may be deployed in a plurality of areas such as a shopping mall, a supermarket, an office building, or a parking lot.

Figure 4:
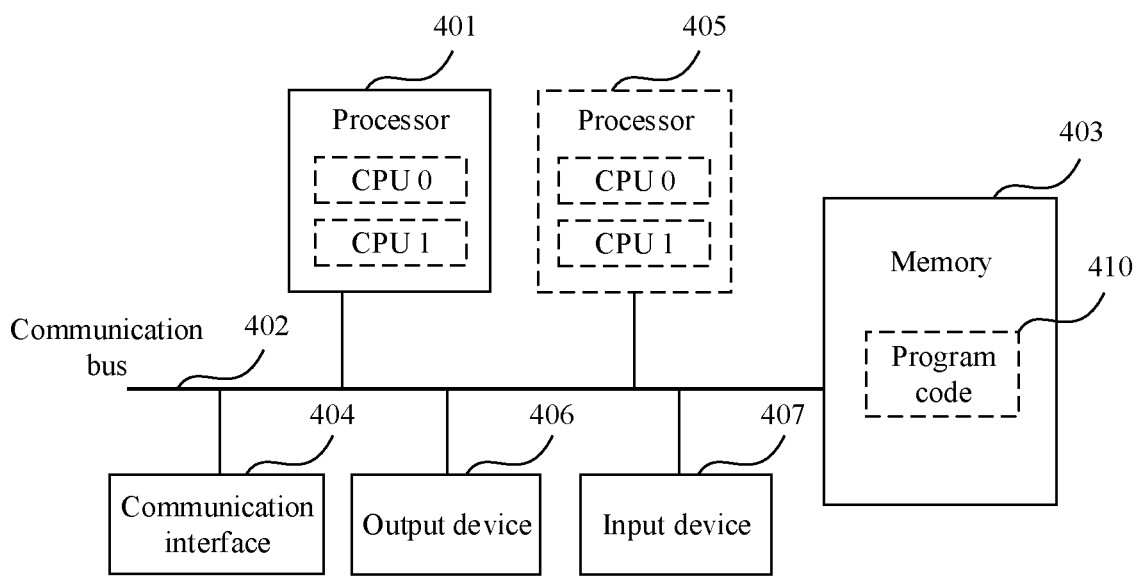
FIG. 4 is a schematic diagram of a structure of a network device according to an embodiment of this application.

FIG. 4 is a schematic diagram of a structure of a network device according to an embodiment of this application. The network device may be the access control device 201 shown in FIG. 2, or may be the access point device 202. The network device may include one or more processors 401, a communication bus 402, a memory 403, and one or more communication interfaces 404.

The processor 401 may be a general-purpose central processing unit (CPU), a network processor (NP), a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The communication bus 402 is configured to transmit information between the foregoing components. The communication bus 402 may be classified into an address bus, a data bus, a control bus, and the like. For ease of representation, only one thick line is used to represent the bus in the figure, but this does not mean that there is only one bus or only one type of bus.

The memory 403 may be a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be configured to carry or store expected program code in a form of an instruction or a data structure and that can be accessed by a network. However, this is not limited hereto. The memory 403 may exist independently, and is connected to the processor 401 by using the communication bus 402. Alternatively, the memory 403 may be integrated with the processor 401.

The communication interface 404 is configured to communicate with another device or a communication network by using any transceiver-type apparatus. The communication interface 404 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

In some embodiments, the network device may include a plurality of processors, for example, the processor 401 and a processor 405 shown in FIG. 4. Each of the processors may be a single-core processor, or may be a multi-core processor. The processor herein may be one or more devices, circuits, and/or processing cores configured to process data (for example, computer program instructions).

During specific implementation, in an embodiment, the network device may further include an output device 406 and an input device 407. The output device 406 communicates with the processor 401, and may display information in a plurality of manners. For example, the output device 406 may be a liquid crystal display (LCD), a light emitting diode (LED) display device, a cathode ray tube (CRT) display device, or a projector. The input device 407 communicates with the processor 401, and may receive a user input in a plurality of manners. For example, the input device 407 may be a mouse, a keyboard, a touchscreen device, or a sensing device.

In some embodiments, the memory 403 is configured to store program code 410 for executing the solutions of this application, and the processor 401 may execute the program code 410 stored in the memory 403. The program code may include one or more software modules. The network device may implement, by using the processor 401 and the program code 410 in the memory 403, a roaming steering method provided in the following embodiment in FIG. 5.

Figure 5:
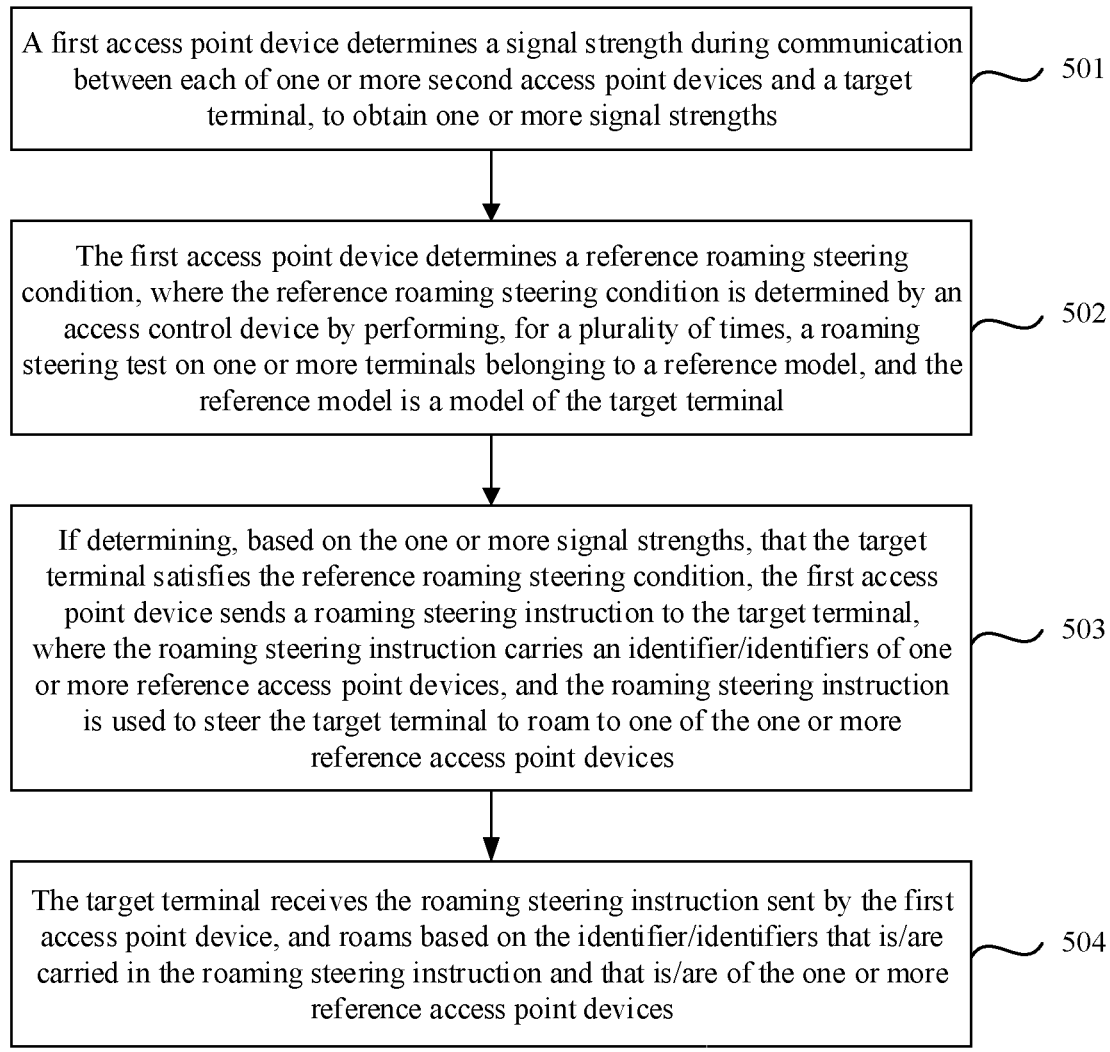
FIG. 5 is a flowchart of a roaming steering method according to an embodiment of this application.

After the terms and the implementation environment in embodiments of this application are explained, the following describes in detail a roaming steering method provided in embodiments of this application. FIG. 5 is a flowchart of a roaming steering method according to an embodiment of this application. The method includes the following steps.

Step 501: A first access point device determines a signal strength during communication between each of one or more second access point devices and a target terminal, to obtain one or more signal strengths. The one or more second access point devices include the first access point device and/or a neighboring access point device of the first access point device. The target terminal is a terminal associated with the first access point device.

In some embodiments, the first access point device may send a strength obtaining request to the target terminal. After receiving the strength obtaining request, the target terminal may determine the signal strength during communication between each of the one or more second access point devices and the target terminal, to obtain the one or more signal strengths, and further send the one or more signal strengths to the first access point device.

It should be noted that the access point device usually broadcasts a beacon frame periodically. Therefore, the target terminal may determine signal strengths of received beacon frames broadcast by the one or more second access point devices, to determine the signal strengths of the received beacon frames broadcast by the one or more second access point devices as signal strengths during communication between the one or more second access point devices and the target terminal, namely, the foregoing one or more signal strengths.

Certainly, determining the signal strength by using the beacon frame is only an example. Because the access point device usually has a radio frequency function, the target terminal may alternatively determine, by using other radio frequency signals transmitted by the one or more second access point devices, the signal strengths during communication between the one or more second access point devices and the target terminal.

In some other embodiments, the first access point device may notify the one or more second access point devices, and the one or more second access point devices determine the signal strengths during communication between the one or more second access point devices and the target terminal, to obtain the one or more signal strengths, and then the corresponding second access point devices send the determined signal strengths to the first access point device.

It should be noted that, to implement association between the target terminal and the access point device, the target terminal usually also has the radio frequency function. Therefore, the one or more second access point devices may determine, by using a radio frequency signal sent by the target terminal, the signal strengths during communication between the target terminal and the one or more second access point devices.

Terminals of different models correspond to different roaming steering conditions. For example, some common roaming steering conditions are: a signal strength of an associated access point device is less than a value 1, a signal strength of a neighboring access point device is greater than a value 2, or a value obtained by subtracting a signal strength of an associated access point device from a signal strength of a neighboring access point device is greater than a value 3. When the roaming steering conditions are different, the one or more second access point devices are also different. For example, when the roaming steering condition is that the signal strength of the associated access point device is less than the value 1, the one or more second access point devices may be the first access point device. When the roaming steering condition is that the signal strength of the neighboring access point device is greater than the value 2, the one or more second access point devices may be the neighboring access point device of the first access point device. When the roaming steering condition is that the value obtained by subtracting the signal strength of the associated access point device from the signal strength of the neighboring access point device is greater than the value 3, the one or more second access point devices may be the first access point device and the neighboring access point device of the first access point device.

Therefore, before determining the one or more signal strengths, the first access point device may determine, based on a reference roaming steering condition, whether the one or more second access point devices are the first access point device, the neighboring access point device of the first access point device, or the first access point device and the neighboring access point device of the first access point device.

Certainly, determining the one or more second access point devices based on the reference roaming steering condition is only an implementation. Alternatively, the first access point device may directly determine the first access point device and the neighboring access point device of the first access point device as the one or more second access point devices, to determine the one or more signal strengths, and subsequently select a corresponding signal strength based on the reference roaming steering condition.

In this embodiment of this application, the neighboring access point device of the first access point device may be one or more third access point devices included in a roaming device list corresponding to the first access point device. The roaming device list corresponding to the first access point device is described in detail subsequently, and details are not described herein.

Step 502: The first access point device determines the reference roaming steering condition. The reference roaming steering condition is determined by an access control device by performing, for a plurality of times, a roaming steering test on one or more terminals belonging to a reference model. The reference model is a model of the target terminal.

In some embodiments, the first access point device may determine a model identifier of the target terminal, and determine the reference roaming steering condition based on the model identifier of the target terminal. The first access point device may obtain the reference roaming steering condition from the access control device based on the model identifier of the target terminal in an active manner or a passive manner. Next, a complete manner in which the first access point device determines the reference roaming steering condition is described in the following two manners.

First manner: The first access point device receives and stores a first correspondence sent by the access control device. The first correspondence is used to indicate a roaming steering condition corresponding to each model identifier identified by the access control device. In this way, the first access point device may directly determine the model identifier of the target terminal, and further determine the reference roaming steering condition from the first correspondence based on the model identifier of the target terminal.

That is, in the first manner, after determining that the first correspondence is obtained, the access control device may actively send the first correspondence to the first access point device. Then, when the first access point device needs to determine the reference roaming steering condition, the first access point device may first determine the model identifier of the target terminal, and further determine the reference roaming steering condition from the first correspondence based on the model identifier of the target terminal. In this way, in a roaming steering process, the first access point device does not need to interact with the access control device to obtain the reference roaming steering condition, but directly determines the reference roaming steering condition from the locally stored first correspondence based on the model identifier of the target terminal. This reduces a quantity of times that the first access point device interacts with the access control device, so that overheads are reduced.

Based on the foregoing descriptions, the first correspondence is used to indicate the roaming steering condition corresponding to each model identifier identified by the access control device, that is, different model identifiers may correspond to different roaming steering conditions. In addition, the roaming steering condition may include two parts. One part is a roaming steering rule, and the other part is a steering threshold. In addition, one model may include a plurality of terminals, in other words, a plurality of different terminals may belong to a same model. Therefore, using the one or more terminals belonging to the reference model as an example, the access control device may determine a plurality of combinations of access point devices. One combination of access point devices includes an identifier of a source access point device and an identifier of a destination access point device. All source access point devices included in the plurality of combinations of access point devices are the first access point device. In addition, one combination of access point devices may correspond to a plurality of different combinations of signal strengths. One combination of signal strengths includes a signal strength of a corresponding source access point device and a signal strength of a corresponding destination access point device. The roaming steering test is performed on, for a plurality of times by using the plurality of combinations of access point devices and the combinations of signal strengths corresponding to each combination of access point devices, the one or more terminals belonging to the reference model by using different steering test conditions, to determine the reference roaming steering condition by using a standard that the terminals of this model are successfully steered to roam. Then, the access control device may add the model identifier of the reference model and the corresponding roaming steering condition to the first correspondence.

It should be noted that the roaming steering condition not only includes the roaming steering rule, but also includes the steering threshold. Therefore, the access control device performs, for a plurality of times, the roaming steering test on the one or more terminals belonging to the reference model, so that the roaming steering rule followed by the one or more terminals belonging to the reference model can be determined, but also the steering threshold can be determined.

For example, the first correspondence that is received and stored by the first access point device and that is sent by the access control device may be as shown in the following Table 1. Assuming that the model identifier that is determined by the first access point device and that is of the target terminal is 146, the first access point device may determine, from the following Table 1 based on the model identifier of the target terminal, that the roaming steering rule in the reference roaming steering condition is a rule R3, and the steering threshold is 10.

TABLE 1

| Model identifier | Roaming steering condition | |
|---|---|---|
| | Roaming steering rule | Steering threshold |
| 146 | Rule R3 | 10 |
| 100 | Rule R2 | −60 |
| 82 | Rule R1 | −75 |
| ... | ... | ... |

It should be noted that the rule R1 in Table 1 may indicate that the signal strength of the associated access point device is lower than the value 1, and the value 1 may be a corresponding steering threshold −75. The rule R2 in Table 1 may indicate that the signal strength of the neighboring access point device is greater than the value 2, and the value 2 may be a corresponding steering threshold −60. The rule R3 in Table 1 may indicate that the value obtained by subtracting the signal strength of the associated access point device from the signal strength of the neighboring access point device is greater than the value 3, and the value 3 may be a corresponding steering threshold 10. Certainly, this is only an example. In some other embodiments, the foregoing rules R1, R2, and R3 may alternatively refer to other rules.

In addition, based on the foregoing descriptions, the roaming steering condition includes the roaming steering rule and the steering threshold, and the access control device may determine the plurality of combinations of access point devices and the plurality of combinations of signal strengths corresponding to each combination of access point devices, to perform, for a plurality of times, the roaming steering test on the one or more terminals belonging to the reference model. Although determining the roaming steering condition based on the signal strength is a simplest and most effective manner, in some other embodiments, the roaming steering condition may alternatively be determined with reference to another feature, for example, a channel, a frequency band (2.4 GHz or 5 GHz), or load of the access point device. The features affect the steering threshold.

Using the channel as an example, steering thresholds are different on different channels. For example, on a channel 36, a roaming steering rule is the rule R3, and a steering threshold is 10. On a channel 149, a roaming steering rule is still the rule R3, but a steering threshold is 8.

Using the frequency band as an example, one access point device generally includes both a 2.4 GHz frequency band and a 5 GHz frequency band. In this case, there are four roaming scenarios: roaming from 2.4 GHz to 5 GHz, roaming from 5 GHz to 2.4 GHz, roaming from 2.4 GHz to 2.4 GHz, and roaming from 5 GHz to 5 GHz. Most terminals support preferential access to the 5 GHz frequency band. Therefore, the four scenarios generally affect the steering threshold. For example, for two scenarios, namely, the scenario of roaming from 2.4 GHz to 2.4 GHz and the scenario of roaming from 5 GHz to 5 GHz, a roaming steering rule is the rule R3, and a steering threshold is 10. For the scenario of roaming from 2.4 GHz to 5 GHz, a roaming steering rule is the rule R3, and a steering threshold is 8. For the scenario of roaming from 5 GHz to 2.4 GHz, a roaming steering rule is the rule R3, and a steering threshold is 12.

Using the load as an example, in some cases, a terminal preferentially chooses to roam to an access point device with light load. In this case, the steering threshold may be affected.

Therefore, after determining the plurality of combinations of access point devices, the access control device may not only perform the roaming steering test based on different signal strengths, but also perform the roaming steering test with reference to parameters such as a channel, a frequency band, and load of an access point device. To be specific, the access point device may perform the roaming steering test for a plurality of times based on one or more of features such as a signal strength, a channel, a frequency band, and load of an access point device, to further determine the reference roaming steering condition.

In other words, the access control device may determine a plurality of combinations of access point devices and a plurality of parameter combinations corresponding to each combination of access point devices. Each combination of access point devices includes an identifier of a source access point device and an identifier of a destination access point device. All source access point devices in the plurality of combinations of access point devices are the first access point device. The access control device performs, for a plurality of times based on the plurality of combinations of access point devices and the plurality of parameter combinations corresponding to each combination of access point devices, the roaming steering test on the one or more terminals belonging to the reference model by using different steering test conditions, to determine the reference roaming steering condition by using a standard that the one or more terminals belonging to the reference model are successfully steered to roam.

The plurality of parameter combinations are obtained by combining different values of one or more dimension features. The one or more dimension features include one or more of a signal strength, a channel, a frequency band, and load.

In some embodiments, after performing, for a plurality of times according to the foregoing method, the roaming steering test on the one or more terminals belonging to the reference model, the access control device may select one or more steering test conditions for successfully steering the terminal of this model to roam, and process the selected steering test conditions, to obtain the reference roaming steering condition. When the selected steering test conditions are the same, the selected steering test condition may be directly used as the reference roaming steering condition. When the selected steering test conditions are different, for example, steering test rules are not completely the same, and/or steering test thresholds are not completely the same, the selected steering test conditions may be processed to obtain the reference roaming steering condition.

It should be noted that, in different scenarios, the selected steering test conditions may be processed in different processing manners. For example, in some embodiments, a steering test rule in each of the selected steering test conditions and a corresponding steering test threshold may be determined, an occurrence frequency of each steering test rule is determined, an average value of steering test thresholds corresponding to a steering test rule with a largest occurrence frequency is determined, the steering test rule with the largest occurrence frequency is determined as the roaming steering rule in the reference roaming steering condition, and the average value of the steering test thresholds corresponding to the steering test rule with the largest occurrence frequency is determined as the steering threshold in the reference roaming steering condition.

In this embodiment of this application, the first access point device may determine the model identifier of the target terminal in a plurality of manners. However, in some embodiments, the model identifier is determined by the access control device. To be specific, if the first access point device wants to learn of the model identifier of the target terminal, the first access point device needs to obtain the model identifier from the access control device. In other words, the first access point device may obtain the model identifier of the target terminal from the access control device. The following describes two manners in which the first access point device determines the model identifier of the target terminal in this case.

(1) The first access point device sends a model query request to the access control device. The model query request carries a MAC address of the target terminal. The access control device receives the model query request sent by the first access point device, and determines the model identifier of the target terminal from a stored second correspondence based on the MAC address of the target terminal. The second correspondence is used to indicate a model identifier corresponding to each MAC address identified by the access control device. Then, the access control device sends the model identifier of the target terminal to the first access point device, and the first access point device receives the model identifier that is sent by the access control device and that is of the target terminal.

That is, in the manner (1), the access control device stores the second correspondence in advance. When the first access point device needs to determine the model identifier of the target terminal, the first access point device may send the model query request to the access control device. In this way, the access control device may determine the model identifier of the target terminal from the second correspondence based on the MAC address of the target terminal, and further send the model identifier of the target terminal to the first access point device. In this way, the access control device does not need to deliver the second correspondence to the first access point device in advance. In addition, when the access control device updates the model identifier of the target terminal, it can be further ensured that the first access point device can obtain a model identifier with high accuracy in time.

Based on the foregoing descriptions, a data packet sent by a terminal associated with an access point device managed by the access control device to another device passes through the access control device. Therefore, the access control device may determine a MAC address of the terminal based on the data packet sent by the terminal, to further determine a model identifier of the terminal, so as to create the second correspondence based on the MAC address and the model identifier of the terminal. Using the target terminal as an example, the access control device may obtain, from the data packet sent by the target terminal, the MAC address of the target terminal and model description information of the target terminal. The access control device determines the model identifier of the target terminal based on the model description information of the target terminal, and stores the MAC address and the model identifier of the target terminal in the second correspondence.

Generally, the data packet sent by the target terminal carries the MAC address of the target terminal and model description information. For example, when the data packet sent by the target terminal is an HTTP packet, the HTTP packet may carry the MAC address of the target terminal, and a user-agent field of the HTTP packet may carry the model description information of the target terminal. Therefore, the access control device may obtain, from the data packet sent by the target terminal, the MAC address and the model description information of the target terminal. For example, the model description information may be Huawei P30, iPhone 8, or the like.

In addition, because terminals of different models have different model description information, the access control device may distinguish between the terminals of different models based on a difference between the model description information. That is, using the target terminal as an example, the access control device may directly use the model description information of the target terminal as the model identifier of the target terminal. Certainly, the access control device may alternatively distinguish between models of the target terminal based on the model description information of the target terminal, and further allocate the corresponding model identifier to the target terminal.

For example, the second correspondence stored in the access control device is shown in the following Table 2, and a model identifier in Table 2 is a model identifier allocated by the access control device to a terminal according to model description information of the terminal. After the first access point device sends the model query request to the access control device, it is assumed that the MAC address that is carried in the model query request and that is of the target terminal is 00:11:22:33:44:55. In this case, the access control device determines, from the second correspondence shown in Table 2 and based on the MAC address of the target terminal, that the model identifier of the target terminal is 146. Then, the access control device sends the model identifier of the target terminal to the first access point device, and the first access point device receives the model identifier that is sent by the access control device and that is of the target terminal.

TABLE 2

| MAC address | Model identifier |
|---|---|
| 00:11:22:33:44:55 | 146 |
| 33:44:55:DD:CC:FF | 82 |
| . . . | . . . |

(2) The access control device obtains, from a data packet sent by the target terminal, a MAC address of the target terminal, determines the model identifier of the target terminal from a stored second correspondence based on the MAC address of the target terminal, and sends the model identifier of the target terminal to the first access point device. Then, the first access point device receives the model identifier that is sent by the access control device and that is of the target terminal.

That is, in the manner (2), after receiving the data packet sent by the target terminal, the access control device may directly obtain the MAC address of the target terminal from the data packet, determine the model identifier of the target terminal from the second correspondence based on the MAC address of the target terminal, and directly send the model identifier to the first access point device. In other words, the access control device may actively determine the model identifier of the target terminal and deliver the model identifier to the first access point device. In this way, the first access point device does not need to request the model identifier of the target terminal from the access control device when performing roaming steering on the target terminal. Therefore, interaction between the first access point device and the access control device in a process in which the first access point device performs roaming steering on the target terminal can be reduced, so that roaming steering efficiency can be improved.

Second manner: The first access point device may directly determine the model identifier of the target terminal, and send a first steering-condition obtaining request to the access control device. The first steering-condition obtaining request carries the model identifier of the target terminal. The access control device receives the first steering-condition obtaining request sent by the first access point device, determines the reference roaming steering condition from a stored first correspondence based on the model identifier of the target terminal, and sends the reference roaming steering condition to the first access point device. Therefore, the first access point device may receive the reference roaming steering condition sent by the access control device.

That is, in the second manner, after determining the first correspondence, the access control device does not deliver the first correspondence to the first access point device. Instead, when the first access point device needs to determine the reference roaming steering condition, the first access point device sends, to the access control device, the first steering-condition obtaining request that carries the model identifier of the target terminal. Further, after the access control device determines the reference roaming steering condition from the first correspondence based on the model identifier of the target terminal, the access control device sends the reference roaming steering condition to the first access point device. In this way, after the reference roaming steering condition is updated, it can be ensured that the first access point device can obtain a reference roaming steering condition with high accuracy in time.

Optionally, for the second manner, in a historical process in which the first access point device performs roaming steering on another terminal, after obtaining a corresponding roaming steering condition from the access control device, the first access point device may locally store a correspondence between a model identifier of the terminal and the corresponding roaming steering condition. In this way, after determining the model identifier of the target terminal, the first access point device may first query, based on the model identifier of the target terminal, whether the reference roaming steering condition is locally stored. If the first access point device does not locally store the reference roaming steering condition, the first access point device may send the first steering-condition obtaining request to the access control device. The access control device further sends the reference roaming steering condition to the first access point device after determining the reference roaming steering condition from the first correspondence based on the model identifier of the target terminal. If the first access point device locally stores the reference roaming steering condition, the first access point device does not need to interact with the access control device, so that a quantity of times of interaction can be reduced, and roaming steering efficiency is improved.

In the second manner, for a method in which the first access point device determines the model identifier of the target terminal, refer to the method in the first manner. Details are not described again in this embodiment of this application.

It should be noted that the foregoing second manner may not only be used to obtain the reference roaming steering condition when roaming steering is performed the target terminal, but also be used to update the reference roaming steering condition locally stored in the first access point device. To be specific, after the access control device updates the reference roaming steering condition in the first correspondence, the first access point device may further obtain an updated roaming steering condition from the access control device in the foregoing second manner.

In this embodiment of this application, the first access point device may not only determine the reference roaming steering condition in the foregoing two manners by using the model identifier of the target terminal, but also alternatively determine the reference roaming steering condition in another manner in some other embodiments. For example, the first access point device may determine the reference roaming steering condition based on a MAC address of the target terminal. To be specific, the first access point device may determine the MAC address of the target terminal, and determine the reference roaming steering condition from the access control device based on the MAC address of the target terminal. Next, a third manner is explained and described in detail below.

Third manner: The first access point device sends a second steering-condition obtaining request to the access control device. The second steering-condition obtaining request carries the MAC address of the target terminal. The access control device receives the second steering-condition obtaining request sent by the first access point device, and determines the model identifier of the target terminal from a stored second correspondence based on the MAC address of the target terminal. The second correspondence is used to indicate a model identifier corresponding to each MAC address identified by the access control device. Then, the access control device determines the reference roaming steering condition from a stored first correspondence based on the model identifier of the target terminal, and sends the reference roaming steering condition to the first access point device. The first access point device receives the reference roaming steering condition sent by the access control device.

That is, in the third manner, the first access point device does not need to determine the model identifier of the target terminal, and may directly send, to the access control device, the second steering-condition obtaining request carrying the MAC address of the target terminal. After receiving the second steering-condition obtaining request, the access control device determines the model identifier of the target terminal from a second correspondence based on the MAC address of the target terminal, and then determines the reference roaming steering condition from the first correspondence based on the model identifier of the target terminal. In other words, in the third manner, the first access point device may obtain the reference roaming steering condition by interacting with the access control device once, and does not need to first interact with the access control device once to determine a reference model identifier, and then interact with the access control device for the second time by using the model identifier to obtain the reference roaming steering condition. That is, a quantity of times that the first access point device interacts with the access control device is reduced, so that overheads are reduced.

Step 503: If determining, based on the one or more signal strengths, that the target terminal satisfies the reference roaming steering condition, the first access point device sends a roaming steering instruction to the target terminal, where the roaming steering instruction carries an identifier/identifiers of one or more reference access point devices, and the roaming steering instruction is used to steer the target terminal to roam to one of the one or more reference access point devices.

After determining the one or more signal strengths in step 501 and determining the reference roaming steering condition in step 502, the first access point device may determine, based on the one or more signal strengths, whether the target terminal satisfies the reference roaming steering condition. If the target terminal satisfies the reference roaming steering condition, the first access point device may send the roaming steering instruction to the target terminal.

The reference roaming steering condition is determined by the access control device by performing, for a plurality of times, the roaming steering test on the one or more terminals belonging to the reference model, and the reference model is the model of the target terminal. Therefore, the reference roaming steering condition is similar to a roaming rule in the target terminal. In this case, when the target terminal satisfies the reference roaming steering condition, the roaming steering instruction is sent to the target terminal, so that it can be ensured there is a high probability that the target terminal is successfully steered to roam. In other words, the reference roaming steering condition can ensure that there is a high probability that the target terminal is successfully steered to roam.

In this embodiment of this application, before sending the roaming steering instruction to the target terminal, the first access point device may determine the identifier/identifiers of the one or more reference access point devices. In an example, the first access point device may obtain the roaming device list from the access control device. The roaming device list includes an identifier/identifiers of the one or more third access point devices. The one or more third access point devices are neighboring access point devices of the first access point device. Then, the first access point device may determine, based on the roaming device list and from the one or more third access point devices, a third access point device as the one or more reference access point devices.

In some embodiments, the one or more second access point devices may include the one or more third access point devices. In this way, an implementation process in which the first access point device determines, based on the roaming device list and from the one or more third access point devices, a third access point device as the one or more reference access point devices may be: selecting, based on the roaming device list and from the one or more third access point devices, a third access point device that satisfies the reference roaming steering condition, to obtain the one or more reference access point devices.

The first access point device may obtain the roaming device list from the access control device in an active manner or a passive manner. Therefore, an identifier of the third access point device that satisfies the reference roaming steering condition is selected from the roaming device list, and the identifier of the selected third access point device is used as the identifier of the one or more reference access point devices. A complete implementation process of determining the identifier/identifiers of the one or more reference access point devices is described with reference to the following two manners.

First manner: The first access point device receives and stores a roaming device list sent by the access control device. The roaming device list includes an identifier/identifiers of one or more third access point devices. The one or more third access point devices are neighboring access point devices of the first access point device. In this way, before sending the roaming steering instruction to the target terminal, the first access point device may select, from the roaming device list, an identifier of a third access point device that satisfies the reference roaming steering condition, and use the identifier of the selected third access point device as the identifier of the one or more reference access point devices.

In some embodiments, the access control device may determine corresponding roaming device lists for different access point devices, and send the roaming device lists to the corresponding access point devices. Using the first access point device as an example, after determining the roaming device list corresponding to the first access point device, the access control device may send the roaming device list to the first access point device. The roaming device list includes identifiers of all other access point devices to which the first access point device can roam, but some access point devices may not satisfy the reference roaming steering condition. Therefore, before sending the roaming steering instruction to the target terminal, the first access point device may select, from the roaming device list, the identifier of the third access point device that satisfies the reference roaming steering condition as the identifier of the one or more reference access point devices.

For the foregoing first manner, the access control device may actively send the roaming device list corresponding to the first access point device to the first access point device. In this way, when the first access point device subsequently performs roaming steering on the target terminal, the first access point device may directly determine, from the roaming device list, the identifier/identifiers of the one or more reference access point devices, and does not need to interact with the access control device, so that overheads are reduced.

For example, the roaming device list that is received and stored by the first access point device and that is sent by the access control device includes an identifier of a third access point device. Before the first access point device sends the roaming steering instruction to the target terminal, assuming that the first access point device determines that the third access point device in the roaming device list satisfies the reference roaming steering condition, the first access point device may directly use the identifier of the third access point device in the roaming device list as the identifier of the reference access point device.

Optionally, when delivering the roaming device list to the first access point device, the access control device may further deliver a quantity of access point devices included in the roaming device list.

Second manner: The first access point device sends a list obtaining request to the access control device. The list obtaining request carries an identifier of the first access point device. The access control device receives the list obtaining request sent by the first access point device, and determines, based on the identifier of the first access point device, the roaming device list corresponding to the first access point device. The roaming device list includes an identifier/identifiers of one or more third access point devices. The one or more third access point devices are neighboring access point devices of the first access point device. Then, the access control device sends the roaming device list to the first access point device. The first access point device receives the roaming device list sent by the access control device, selects, from the roaming device list, the identifier of the third access point device that satisfies the reference roaming steering condition, and uses the identifier of the selected third access point device as the identifier of the one or more reference access point devices.

In some embodiments, the access control device may determine corresponding roaming device lists for different access point devices, and then store a device identifier of each access point device and a corresponding roaming device list in a correspondence between the device identifier and the roaming device list. In this way, when determining, based on the identifier of the first access point device, the roaming device list corresponding to the first access point device, the first access point device may determine, based on the identifier of the first access point device and from the stored correspondence between the device identifier and the roaming device list, the roaming device list corresponding to the first access point device, and send the roaming device list corresponding to the first access point device to the first access point device.

In some other embodiments, the access control device may determine an identifier/identifiers of one or more corresponding third access point devices for different access point devices, and then store, in a correspondence between a first device identifier and a second device identifier, a device identifier of each access point device and an identifier/identifiers of one or more corresponding third access point devices. To be specific, the identifier of each access point device is used as the first device identifier, the identifiers of the third access point devices corresponding to each access point device are used as the second device identifier, and the device identifier of each access point device and the identifier/identifiers of the corresponding one or more third access point devices are stored in the correspondence between the first device identifier and the second device identifier. In this way, when determining, based on the identifier of the first access point device, the roaming device list corresponding to the first access point device, the first access point device may use the identifier of the first access point device as the first device identifier, determine an identifier/identifiers of one or more corresponding second device identifiers from the correspondence between the first device identifier and the second device identifier, and further use the identifier/identifiers of the determined one or more second device identifiers as the identifier/identifiers of the one or more third access point devices corresponding to the first access point device. Then, the access control device generates the roaming device list including the identifier/identifiers of the one or more third access point devices, and sends the roaming device list to the first access point device.

For the foregoing second manner, after determining the identifier/identifiers of the one or more third access point devices corresponding to the first access point device, the access control device does not generate the roaming device list and deliver the roaming device list to the first access point device, but stores the correspondence between the device identifier and the roaming device list or the correspondence between the first device identifier and the second device identifier. Therefore, when the first access point device performs roaming steering on a terminal (for example, the target terminal), and the access control device receives the list obtaining request sent by the first access point device, the access control device may determine, in the foregoing manner, the roaming device list corresponding to the first access point device, and send the roaming device list corresponding to the first access point device to the first access point device. In this way, when the roaming device list corresponding to the first access point device is updated, it can be ensured that the first access point device can obtain a roaming device list with high accuracy.

For example, the first access point device sends a list obtaining request to the access control device. An identifier that is carried in the list obtaining request and that is of the first access point device is 48f8-db86-3460. The access control device receives the list obtaining request sent by the first access point device, and determines, based on the identifier of the first access point device and from a correspondence that is between a device identifier and a roaming device list and that is shown in the following Table 3, that the corresponding roaming device list includes one third access point device, and an identifier of the third access point device is 48f8-db79-2420. Then, the access control device sends the roaming device list to the first access point device. The first access point device receives the roaming device list sent by the access control device. It is assumed that the third access point device in the roaming device list satisfies the reference roaming steering condition. In this case, the first access point device may directly use the identifier of the third access point device in the roaming device list as the identifier of the reference access point device.

TABLE 3

| Device identifier | Roaming device list |
|---|---|
| 48f8-db86-3460 | 48f8-db79-2420 |
| 48f8-db06-f9e0 | 48f8-db86-2f80, 48f8-db07-0ba0 |
| . . . | . . . |

In the foregoing second manner, before determining, based on the identifier of the first access point device, the roaming device list corresponding to the first access point device, the access control device may further determine the identifier/identifiers of the one or more third access point devices corresponding to the first access point device. To be specific, the access control device obtains a plurality of historical roaming records and roaming experience indication information that corresponds to each historical roaming record. Each historical roaming record includes an identifier of a source access point device and an identifier of a destination access point device. All source access point devices in the plurality of historical roaming records are the first access point device. The roaming experience indication information is used to indicate whether signal quality is improved after a terminal associated with the first access point device roams to a destination access point device corresponding to a corresponding historical roaming record. The access control device determines, based on the plurality of historical roaming records and the roaming experience indication information that corresponds to each historical roaming record, the identifier/identifiers of the one or more third access point devices corresponding to the first access point device. The access control device stores the identifier/identifiers of the one or more third access point devices based on the identifier of the first access point device.

Based on the foregoing descriptions, the access control device may store a correspondence between a device identifier and a roaming device list, and may further store a correspondence between a first device identifier and a second device identifier. Therefore, an implementation process in which the access control device stores the identifier/identifiers of the one or more third access point devices based on the identifier of the first access point device may be: The access control device generates a roaming device list, namely, the roaming device list corresponding to the first access point device, by using the identifier/identifiers of the one or more third access point devices corresponding to the first access point device, and then stores, in the correspondence between the device identifier and the roaming device list, the identifier of the first access point device and the roaming device list corresponding to the first access point device. Alternatively, the access control device may use the identifier of the first access point device as the first device identifier, use the identifiers of the third access point devices corresponding to the first access point device as the second device identifier, and store, in the correspondence between the first device identifier and the second device identifier, the identifier of the first access point device and the identifier/identifiers of the one or more third access point devices corresponding to the first access point device.

It should be noted that, in this embodiment of this application, the first access point device may report, to the access control device, a signal strength during communication between the first access point device and the target terminal, and may further report, to the access control device, information such as the identifier/identifiers that is/are of the one or more reference access point devices and that is/are in the roaming steering instruction delivered by the first access point device to the target terminal and a quantity of times of steering. Similarly, another access point device may also report the foregoing information to the access control device. For example, it is assumed that the target terminal roams to one of the one or more reference access point devices, and the reference access point device may report, to the access control device, a signal strength during communication between the reference access point device and the target terminal. In this way, the access control device may determine a roaming record based on the information. In the roaming record, an identifier of a source access point device is the identifier of the first access point device, an identifier of a target access point device is the identifier of the reference access point device after roaming, and roaming experience indication information may be determined based on a signal strength before roaming and a signal strength after roaming.

Similarly, the access control device may determine a plurality of historical roaming records and roaming experience indication information that corresponds to each historical roaming record.

In some embodiments, that the access control device determines, based on the plurality of historical roaming records and the roaming experience indication information that corresponds to each historical roaming record, the identifier/identifiers of the one or more third access point devices corresponding to the first access point device includes: The access control device selects, based on the roaming experience indication information that corresponds to each historical roaming record and from the plurality of historical roaming records, a historical roaming record that signal quality is improved after roaming. The access control device determines an identifier of a destination access point device included in the selected historical roaming record as the identifier of the one or more third access point devices corresponding to the first access point device.

In some other embodiments, the access control device may determine, in a reinforcement learning manner based on the plurality of historical roaming records and the roaming experience indication information that corresponds to each historical roaming record, the identifier/identifiers of the one or more third access point devices corresponding to the first access point device. To be specific, the access control device selects, based on the roaming experience indication information that corresponds to each historical roaming record and from the plurality of historical roaming records, a historical roaming record that signal quality is improved after roaming. The access control device obtains an identifier of a neighboring access point device of the first access point device. The neighboring access point device is not included in the plurality of historical roaming records. The access control device determines an identifier of a destination access point device included in the selected historical roaming record and the obtained identifier of the neighboring access point device as the identifiers of the one or more third access point devices corresponding to the first access point device.

It should be noted that the reinforcement learning is one of AI algorithms, and is a target-oriented algorithm. This learning algorithm may make the determined one or more third access point devices more accurate. To be specific, the one or more third access point devices determined in the reinforcement learning manner are access point devices whose signal quality is improved after the third access point devices roam from the first access point device. In addition, the plurality of historical roaming records include an access point device on which roaming steering has been performed before, but an access point device on which roaming steering has not been performed may also be an access point device whose signal quality is improved. As a result, the neighboring access point device that is not included in the plurality of historical roaming records may also be used as the third access point device. A neighboring access point device that is not included in the plurality of historical roaming records may be determined according to a rule.

In an example, the access control device may determine a quantity of first-type access control devices. The first-type access control device is a destination access control device in the historical roaming record that signal quality is improved after roaming. Then, the access control device may divide the quantity of first-type access control devices by a reference ratio, to obtain a quantity of second-type access point devices. The second-type access point device is a neighboring access point device that is not included in the plurality of historical roaming records. The reference ratio is a ratio of the quantity of first-type access point devices to the quantity of second-type access point devices in the one or more third access point devices. In this way, the access control device may select, as the third access point device based on the quantity of second-type access point devices, a neighboring access point device from neighboring access point devices that are not included in the plurality of historical roaming records.

For example, the reference ratio is 8:2, and the quantity of first-type access control devices that is determined by the access control device is four. In this case, the quantity of second-type access point devices is one. Therefore, the access control device may not only use the four first-type access point devices as the third access point devices, but also select, as the third access point device, one neighboring access point device from the neighboring access point devices that are not included in the plurality of historical roaming records.

The first-type access point device can ensure that there is a high probability that roaming steering succeeds, that is, can ensure a roaming steering success rate. However, to achieve a reinforcement learning effect, some neighboring access point devices that are not included in the historical roaming records may be added. However, generally, the quantity of first-type access point devices is greater than the quantity of second-type access point devices. That is, the quantity of the first-type access point devices accounts for a larger proportion than the quantity of the second-type access point devices.

It should be noted that the determining the quantity of the second-type access point devices based on the reference ratio is only an implementation. In some other embodiments, the quantity of the second-type access point devices may alternatively be determined in another manner, provided that the quantity of the first-type access point devices accounts for a larger proportion than the quantity of the second-type access point devices.

In this embodiment of this application, reinforcement learning may be periodically performed, and each time reinforcement learning is performed, the one or more determined third access point devices tend to be more accurate.

Based on the foregoing descriptions of step 501, the neighboring access point device that is included in the one or more second access point devices and that is of the first access point device may be determined by using the roaming device list corresponding to the first access point device. The roaming device list corresponding to the first access point device may be obtained based on a related implementation in the foregoing two manners. To be specific, the roaming device list actively pushed by the access control device may be received, or after the list obtaining request is sent to the access control device, the roaming device list sent by the access control device is received.

Step 504: The target terminal receives the roaming steering instruction sent by the first access point device, and roams based on the identifier/identifiers that is/are carried in the roaming steering instruction and that is/are of the one or more reference access point devices.

The reference roaming steering condition is determined after the access control device performs, for a plurality of times, the steering test on the one or more terminals belonging to the reference model, and the reference model is the model of the target terminal. However, the reference roaming steering condition may not comply with the roaming rule in the target terminal. Therefore, after receiving the roaming steering instruction sent by the first access point device, the target terminal may determine whether there is a reference access point device that satisfies the roaming rule in the target terminal in the one or more reference access point devices. If there is the reference access point device that satisfies the roaming rule in the target terminal, the target terminal may roam based on an identifier of the reference access point device that satisfies the roaming rule in the target terminal, that is, be handed over from an association with the first access point device to an association with the reference access point device that satisfies the roaming rule in the target terminal.

However, if there is no reference access point device that satisfies the roaming rule in the target terminal in the one or more reference access point devices, the target terminal does not roam. That is, the target terminal maintains an association with the first access point device.

In conclusion, in this embodiment of this application, a reference roaming steering condition is determined by an access control device by performing, for a plurality of times, a roaming steering test on one or more terminals belonging to a reference model, and the reference model is a model of a target terminal. Therefore, the reference roaming steering condition is similar to a roaming rule in the target terminal. In this case, when the first access point device obtains the reference roaming steering condition and determines that the target terminal satisfies the reference roaming steering condition, even if the target terminal does not unconditionally obey roaming steering of the first access point device, there is a high probability that the target terminal is successfully steered to roam. In addition, the access control device determines different roaming steering conditions for terminals of different models. Even if roaming rules in the terminals of different models are different, when roaming steering is performed according to the foregoing method, a roaming steering success rate may also be improved.

Figure 6:
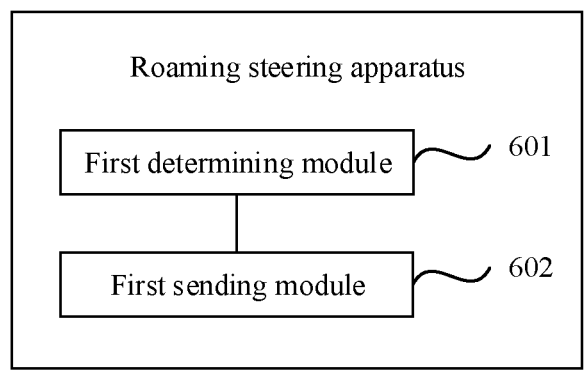
FIG. 6 is a schematic diagram of a structure of a roaming steering apparatus according to an embodiment of this application.

FIG. 6 is a schematic diagram of a structure of a roaming steering apparatus according to an embodiment of this application. The apparatus is located in a first access point device. The apparatus may be implemented as a part or all of the first access point device by using software, hardware, or a combination thereof. Refer to FIG. 6. The apparatus includes: a first determining module 601 and a first sending module 602.

The first determining module 601 is configured to determine a signal strength during communication between each of one or more second access point devices and a target terminal, to obtain one or more signal strengths. The one or more second access point devices include a first access point device and/or a neighboring access point device of the first access point device. The target terminal is a terminal associated with the first access point device.

The first determining module 601 is further configured to determine, based on the one or more signal strengths, that the target terminal satisfies a reference roaming steering condition.

The first sending module 602 is configured to: when the first determining module determines that the target terminal satisfies the reference roaming steering condition, send a roaming steering instruction to the target terminal. The roaming steering instruction carries an identifier/identifiers of one or more reference access point devices. The roaming steering instruction is used to steer the target terminal to roam to one of the one or more reference access point devices. The reference roaming steering condition is determined by an access control device by performing, for a plurality of times, a roaming steering test on one or more terminals belonging to a reference model. The reference model is a model of the target terminal.

Optionally, the apparatus further includes:
a second determining module, configured to determine a model identifier of the target terminal; and
a third determining module, configured to determine the reference roaming steering condition based on the model identifier.

Optionally, the apparatus further includes:
a first receiving module, configured to receive and store a first correspondence sent by the access control device. The first correspondence is used to indicate a roaming steering condition corresponding to each model identifier identified by the access control device.
The third determining module is configured to:
determine the reference roaming steering condition from the first correspondence based on the model identifier of the target terminal.

Optionally, the third determining module includes:
a first sending submodule, configured to send a first steering-condition obtaining request to the access control device, where the first steering-condition obtaining request carries the model identifier of the target terminal; and
a first receiving submodule, configured to receive the reference roaming steering condition sent by the access control device, where the reference roaming steering condition is determined by the access control device based on the model identifier of the target terminal and from a first correspondence stored in the access control device, and the first correspondence is used to indicate a roaming steering condition corresponding to each model identifier identified by the access control device.

Optionally, the second determining module includes:

an obtaining submodule, configured to obtain the model identifier of the target terminal from the access control device.

Optionally, the obtaining submodule includes:

a sending unit, configured to send a model query request to the access control device, where the model query request carries a media access control MAC address of the target terminal, and the first access point device receives the model identifier that is sent by the access control device and that is of the target terminal; or a receiving unit, configured to receive the model identifier that is sent by the access control device and that is of the target terminal, where the model identifier of the target terminal is determined by the access control device by using a MAC address of the target terminal after the access control device obtains, from a data packet sent by the target terminal, the MAC address of the target terminal.

Optionally, the apparatus further includes:

a second sending module, configured to send a second steering-condition obtaining request to the access control device, where the second steering-condition obtaining request carries a MAC address of the target terminal; and a second receiving module, configured to receive the reference roaming steering condition sent by the access control device, where the reference roaming steering condition is determined by the access control device, from a first correspondence stored in the access control device, after the access control device determines a model identifier of the target terminal based on the MAC address of the target terminal, and the first correspondence is used to indicate a roaming steering condition corresponding to each model identifier identified by the access control device.

Optionally, the apparatus further includes:

an obtaining module, configured to obtain a roaming device list from the access control device, where the roaming device list includes an identifier/identifiers of one or more third access point devices, and the one or more third access point devices are neighboring access point devices of the first access point device; and a fourth determining module, configured to determine, based on the roaming device list and from the one or more third access point devices, a third access point device as the one or more reference access point devices.

Optionally, the obtaining module includes:

a second receiving submodule, configured to receive the roaming device list sent by the access control device; or a second sending submodule, configured to send a list obtaining request to the access control device, where the list obtaining request carries an identifier of the first access point device; and a third receiving submodule, configured to receive the roaming device list sent by the access control device.

Optionally, the one or more second access point devices include the one or more third access point devices.

The fourth determining module includes:

a selection submodule, configured to select, based on the roaming device list and from the one or more third access point devices, a third access point device that satisfies the reference roaming steering condition, to obtain the one or more reference access point devices.

In this embodiment of this application, a reference roaming steering condition is determined by an access control device by performing, for a plurality of times, a roaming steering test on one or more terminals belonging to a reference model, and the reference model is a model of a target terminal. Therefore, the reference roaming steering condition is similar to a roaming rule in the target terminal. In this case, when the first access point device obtains the reference roaming steering condition and determines that the target terminal satisfies the reference roaming steering condition, even if the target terminal does not unconditionally obey roaming steering of the first access point device, there is a high probability that the target terminal is successfully steered to roam. In addition, the access control device determines different roaming steering conditions for terminals of different models. Even if roaming rules in the terminals of different models are different, when roaming steering is performed according to the foregoing method, a roaming steering success rate may also be improved.

It should be noted that, when the roaming steering apparatus provided by the foregoing embodiment performs roaming steering, division of the foregoing functional modules is merely used as an example for description. In practice, the foregoing functions may be allocated to different functional modules for implementation as required, that is, an internal structure of the apparatus is divided into different functional modules, so as to implement all or a part of the functions described above. In addition, the roaming steering apparatus provided in the foregoing embodiment and the roaming steering method embodiments pertain to a same concept. For a specific implementation process, refer to the method embodiments. Details are not described herein again.

Figure 7:
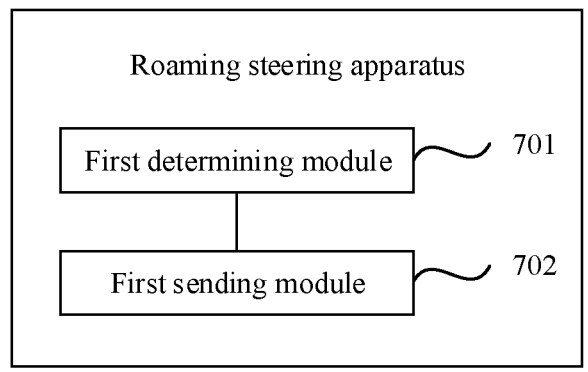
FIG. 7 is a schematic diagram of a structure of another roaming steering apparatus according to an embodiment of this application.

FIG. 7 is a schematic diagram of a structure of a roaming steering apparatus according to an embodiment of this application. The apparatus is located in an access control device. The apparatus may be implemented as a part or all of the access control device by using software, hardware, or a combination thereof. Refer to FIG. 7. The apparatus includes: a first determining module 701 and a first sending module 702.

The first determining module 701 is configured to determine a reference roaming steering condition by performing, for a plurality of times, a roaming steering test on one or more terminals belonging to a reference model.

The first sending module 702 is configured to send the reference roaming steering condition to a first access point device. A model of a target terminal associated with the first access point device is the reference model. The first access point device is an access point device controlled by an access control device.

Optionally, the first sending module is configured to:

send a first correspondence to the first access point device, where the first correspondence is used to indicate a roaming steering condition corresponding to each model identifier identified by the access control device.

Optionally, the apparatus further includes:

a first receiving module, configured to receive a first steering-condition obtaining request sent by the first access point device, where the first steering-condition obtaining request carries a model identifier of the target terminal; and a second determining module, configured to determine the reference roaming steering condition from a stored first correspondence based on the model identifier of the target terminal, where the first correspondence is used to indicate a roaming steering condition corresponding to each model identifier identified by the access control device.

Optionally, the apparatus further includes:

a first obtaining module, configured to obtain a media access control MAC address of the target terminal;

a third determining module, configured to determine the model identifier of the target terminal from a stored second correspondence based on the MAC address of the target terminal, where the second correspondence is used to indicate a model identifier corresponding to each MAC address identified by the access control device; and a second sending module, configured to send the model identifier of the target terminal to the first access point device, to enable the first access point device to determine the reference roaming steering condition based on the model identifier of the target terminal.

Optionally, the first obtaining module includes:

a receiving submodule, configured to receive a model query request sent by the first access point device, where the model query request carries the MAC address of the target terminal; or an obtaining submodule, configured to obtain, from a data packet sent by the target terminal, the MAC address of the target terminal.

Optionally, the apparatus further includes:

a second receiving module, configured to receive a second steering-condition obtaining request sent by the first access point device, where the second steering-condition obtaining request carries a MAC address of the target terminal; and a fourth determining module, configured to determine a model identifier of the target terminal from a stored second correspondence based on the MAC address of the target terminal, where the second correspondence is used to indicate a model identifier corresponding to each MAC address identified by the access control device; and determine the reference roaming steering condition from a stored first correspondence based on the model identifier of the target terminal, where the first correspondence is used to indicate a roaming steering condition corresponding to each model identifier identified by the access control device.

Optionally, the apparatus further includes:

a second obtaining module, configured to obtain, from a data packet sent by the target terminal, the MAC address of the target terminal and model description information of the target terminal;

a fifth determining module, configured to determine the model identifier of the target terminal based on the model description information of the target terminal; and a first storage module, configured to store the MAC address and the model identifier of the target terminal in the second correspondence.

Optionally, the apparatus further includes:

a third receiving module, configured to receive a list obtaining request sent by the first access point device, where the list obtaining request carries an identifier of the first access point device;

a sixth determining module, configured to determine, based on the identifier of the first access point device, a roaming device list corresponding to the first access point device, where the roaming device list includes an identifier/identifiers of one or more third access point devices, and the one or more third access point devices are neighboring access point devices of the first access point device; and a third sending module, configured to send the roaming device list to the first access point device.

Optionally, the apparatus further includes:

a third obtaining module, configured to obtain a plurality of historical roaming records and roaming experience indication information that corresponds to each historical roaming record, where each historical roaming record includes an identifier of a source access point device and an identifier of a destination access point device, all source access point devices in the plurality of historical roaming records are the first access point device, and the roaming experience indication information is used to indicate whether signal quality is improved after a terminal associated with the first access point device roams to a destination access point device corresponding to a corresponding historical roaming record;

a seventh determining module, configured to determine the identifier/identifiers of the one or more third access point devices based on the plurality of historical roaming records and the roaming experience indication information that corresponds to each historical roaming record; and a second storage module, configured to store the identifier/identifiers of the one or more third access point devices based on the identifier of the first access point device.

Optionally, the seventh determining module includes:

a determining submodule, configured to determine the identifier/identifiers of the one or more third access point devices in a reinforcement learning manner based on the plurality of historical roaming records and the roaming experience indication information that corresponds to each historical roaming record.

Optionally, the determining submodule is configured to:

select, based on the roaming experience indication information that corresponds to each historical roaming record and from the plurality of historical roaming records, a historical roaming record that signal quality is improved after roaming;

obtain an identifier of a neighboring access point device of the first access point device, where the neighboring access point device is not included in the plurality of historical roaming records; and determine an identifier of a destination access point device included in the selected historical roaming record and the obtained identifier of the neighboring access point device as the identifiers of the one or more third access point devices.

Optionally, the first determining module is configured to:

determine a plurality of combinations of access point devices and a plurality of parameter combinations corresponding to each combination of access point devices, where each combination of access point devices includes an identifier of a source access point device and an identifier of a destination access point device, and all source access point devices in the plurality of combinations of access point devices are the first access point device; and perform, for a plurality of times based on the plurality of combinations of access point devices and the plurality of parameter combinations corresponding to each combination of access point devices, the roaming steering test on the one or more terminals belonging to the reference model by using different steering test conditions, to determine the reference roaming steering condition by using a standard that the one or more terminals belonging to the reference model are successfully steered to roam.

Optionally, the plurality of parameter combinations are obtained by combining different values of one or more dimension features. The one or more dimension features include one or more of a signal strength, a channel, a frequency band, and load.

In this embodiment of this application, a reference roaming steering condition is determined by an access control device by performing, for a plurality of times, a roaming steering test on one or more terminals belonging to a reference model, and the reference model is a model of a target terminal. Therefore, the reference roaming steering condition is similar to a roaming rule in the target terminal. In this case, when the first access point device obtains the reference roaming steering condition and determines that the target terminal satisfies the reference roaming steering condition, even if the target terminal does not unconditionally obey roaming steering of the first access point device, there is a high probability that the target terminal is successfully steered to roam. In addition, the access control device determines different roaming steering conditions for terminals of different models. Even if roaming rules in the terminals of different models are different, when roaming steering is performed according to the foregoing method, a roaming steering success rate may also be improved.

It should be noted that, when the roaming steering apparatus provided by the foregoing embodiment performs roaming steering, division of the foregoing functional modules is merely used as an example for description. In practice, the foregoing functions may be allocated to different functional modules for implementation as required, that is, an internal structure of the apparatus is divided into different functional modules, so as to implement all or a part of the functions described above. In addition, the roaming steering apparatus provided in the foregoing embodiment and the roaming steering method embodiments pertain to a same concept. For a specific implementation process, refer to the method embodiments. Details are not described herein again.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like. It should be noted that the computer-readable storage medium mentioned in this application may be a non-volatile storage medium. In other words, the computer-readable storage medium may be a non-transitory storage medium.

It should be understood that "at least one" mentioned in this specification means one or more, and that "a plurality of" means at least two. In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A roaming steering method, the method comprising:
   determining, by a first access point device, a signal strength between each of one or more second access point devices and a target terminal, to obtain one or more signal strengths, wherein the one or more second access point devices comprise the first access point device and/or a neighboring access point device of the first access point device, and the target terminal is a terminal associated with the first access point device;
   if the one or more signal strengths satisfy a reference roaming steering condition, causing, by the first access point device, the target terminal to roam, wherein the reference roaming steering condition is determined based on a plurality of roaming steering test results of a plurality of roaming steering tests, wherein the plurality of roaming steering tests are performed on a plurality of terminals belonging to a plurality of reference models, wherein each roaming steering test is performed on one of the plurality of terminals.

2. The method according to claim 1, the method further comprising:
   determining, by the first access point device, a model identifier of the target terminal; and
   obtaining, by the first access point device, the reference roaming steering condition based on the model identifier of the target terminal.

3. The method according to claim 2, the method further comprising:
   storing, by the first access point device, a first correspondence, wherein the first correspondence indicates roaming steering conditions corresponding to respective model identifiers of terminals;
   wherein the obtaining, by the first access point device, the reference roaming steering condition based on the model identifier of the target terminal comprises:

obtaining, by the first access point device, the reference roaming steering condition from the first correspondence based on the model identifier of the target terminal.

4. The method according to claim 2, wherein the obtaining, by the first access point device, the reference roaming steering condition based on the model identifier of the target terminal comprises:
sending, by the first access point device, a first steering-condition obtaining request that carries the model identifier of the target terminal; and
receiving, by the first access point device in response to the first steering-condition obtaining request, the reference roaming steering condition corresponding to the model identifier of the target terminal.

5. The method according to claim 4, the method further comprising:
sending, by the first access point device, a second steering-condition obtaining request that carries a media access control (MAC) address of the target terminal; and
receiving, by the first access point device in response to the first steering-condition obtaining request, the reference roaming steering condition corresponding to the model of the target terminal.

6. The method according to claim 1, wherein the reference roaming steering condition corresponding to the model of the target terminal is determined from a plurality of reference roaming steering conditions, each of the plurality of reference roaming steering conditions corresponding to one of a plurality of model identifiers of terminals and indicating a roaming steering rule and a steering threshold.

7. A method performed by a device, the method comprising:
obtaining a plurality of roaming steering test results of a plurality of roaming steering tests, wherein the plurality of roaming steering tests are performed on a plurality of terminals belonging to a plurality of reference models; and
determining a reference roaming steering condition based on the roaming steering test results of the plurality of roaming steering tests, wherein the reference roaming steering condition is used for roaming steer control on a target terminal.

8. The method according to claim 7, the method further comprising:
sending the reference roaming steering condition to a first access point device for roaming steering control on the target terminal associated with the first access point device.

9. The method according to claim 7, the method further comprising:
receiving a list obtaining request sent by a first access point device, wherein the list obtaining request carries an identifier of the first access point device;
determining, based on the identifier of the first access point device, a roaming device list corresponding to the first access point device, wherein the roaming device list comprises an identifier/identifiers of one or more third access point devices, and the one or more third access point devices are neighboring access point devices of the first access point device; and
sending the roaming device list to the first access point device.

10. The method according to claim 7, wherein the method further comprises:
determining a plurality of combinations of access point devices and a plurality of parameter combinations corresponding to each combination of access point devices, wherein each combination of access point devices comprises an identifier of a source access point device and an identifier of a destination access point device; and
performing, based on the plurality of combinations of access point devices and the plurality of parameter combinations corresponding to each combination of access point devices, the plurality of roaming steering tests on the plurality of terminals belonging to the plurality of reference models.

11. A first access point device, comprising:
at least one processor; and
a memory, coupled to the at least one processor and configured to store instructions that when executed by the at least one processor cause the first access point device to:
determine a signal strength between each of one or more second access point devices and a target terminal, to obtain one or more signal strengths, wherein the one or more second access point devices comprise the first access point device and/or a neighboring access point device of the first access point device, and the target terminal is a terminal associated with the first access point device;
if the one or more signal strengths satisfy a reference roaming steering condition, cause the target terminal to roam, wherein the reference roaming steering condition is determined based on a plurality of roaming steering test results of a plurality of roaming steering tests, wherein the plurality of roaming steering tests are performed on a plurality of terminals belonging to a plurality of reference models, wherein each roaming steering test is performed on one of the plurality of terminals.

12. The first access point device according to claim 11, wherein when executed by the at least one processor, the instructions further cause the first access point device to:
determine a model identifier of the target terminal; and
obtain the reference roaming steering condition based on the model identifier.

13. The first access point device according to claim 12, wherein when executed by the at least one processor, the instructions further cause the first access point device to:
store a first correspondence, wherein the first correspondence indicates roaming steering conditions corresponding to respective model identifiers of terminals; and
obtain the reference roaming steering condition from the first correspondence based on the model identifier of the target terminal.

14. The first access point device according to claim 12, wherein when executed by the at least one processor, the instructions further cause the first access point device to
send a first steering-condition obtaining request that carries the model identifier of the target terminal; and
receive the reference roaming steering condition in response to the first steering-condition obtaining request, the reference roaming steering condition corresponding to the model identifier of the target terminal.

15. The first access point device according to claim 11, wherein when executed by the at least one processor, the instructions further cause the first access point device to:

send a second steering-condition obtaining request that carries a media access control (MAC) address of the target terminal; and receive the reference roaming steering condition in response to the second steering-condition obtaining request, the reference roaming steering condition corresponding to the model of the target terminal associated with the MAC address of the target terminal.

16. The method according to claim 1, wherein the causing, by the first access point device, the target terminal to roam, comprises:

sending, by the first access point device, a roaming steering instruction to the target terminal, wherein the roaming steering instruction carries an identifier/identifiers of one or more reference access point devices, the roaming steering instruction is used to steer the target terminal to roam to one of the one or more reference access point devices.

17. The method according to claim 16, wherein before sending, by the first access point device, the roaming steering instruction to the target terminal, the method further comprises:

obtaining, by the first access point device, a roaming device list that comprises an identifier/identifiers of one or more third access point devices, wherein the one or more third access point devices are neighboring access point devices of the first access point device; and determining, by the first access point device based on the roaming device list and from the one or more third access point devices, a third access point device as the one or more reference access point devices.

18. The first access point device according to claim 11, wherein when executed by the at least one processor, the instructions further cause the first access point device to:

send a roaming steering instruction to the target terminal, wherein the roaming steering instruction carries an identifier/identifiers of one or more reference access point devices, the roaming steering instruction is used to steer the target terminal to roam to one of the one or more reference access point devices.

19. The method according to claim 18, wherein when executed by the at least one processor, the instructions further cause the first access point device to:

obtain a roaming device list that comprises an identifier/identifiers of one or more third access point devices, wherein the one or more third access point devices are neighboring access point devices of the first access point device; and determine, based on the roaming device list, a third access point device as the one or more reference access point devices.

20. The method according to claim 8, wherein the sending the reference roaming steering condition to the first access point device comprises:

sending, to the first access point device, a first correspondence indicating roaming steering conditions corresponding to respective model identifiers of terminals.

* * * * *